(12) United States Patent
Klupacs et al.

(10) Patent No.: US 11,259,522 B2
(45) Date of Patent: Mar. 1, 2022

(54) CONTROL OF RESISTANT PESTS

(71) Applicant: Bio-Gene Technology Limited, Melbourne (AU)

(72) Inventors: Robert Klupacs, East Melbourne (AU); Peter May, Red Hill (AU)

(73) Assignee: BIO-GENE TECHNOLOGY LIMITED, Melbourne (AU)

( * ) Notice: Subject to any disclaimer, the term of this patent is extended or adjusted under 35 U.S.C. 154(b) by 0 days.

(21) Appl. No.: 16/856,984

(22) Filed: Apr. 23, 2020

(65) Prior Publication Data
US 2020/0323202 A1  Oct. 15, 2020

Related U.S. Application Data

(63) Continuation of application No. 16/629,260, filed as application No. PCT/AU2018/050704 on Jul. 6, 2018.

(30) Foreign Application Priority Data

Jul. 7, 2017 (AU) ................ 2017902671
Dec. 7, 2017 (AU) ................ 2017904935

(51) Int. Cl.
*A01N 35/06* (2006.01)
*A01N 37/34* (2006.01)
*A01N 57/16* (2006.01)

(52) U.S. Cl.
CPC ............. *A01N 35/06* (2013.01); *A01N 37/34* (2013.01); *A01N 57/16* (2013.01)

(58) Field of Classification Search
CPC ......... A01N 35/06; A01N 37/34; A01N 57/16
USPC ...................................................... 514/690
See application file for complete search history.

(56) References Cited

U.S. PATENT DOCUMENTS 7,820,209 B2 * 10/2010 Spooner-Hart ........ A01N 35/06
424/742

FOREIGN PATENT DOCUMENTS

WO  WO 2002/089587 A1  11/2002
WO  WO 2017/221158 A1  12/2017

OTHER PUBLICATIONS

Sparks et al Pesticide Biochemistry and Physiology, 2015, 121, 122-128. (Year: 2015).*
Peter May (International Pest control, 2016, 58(6), 310-311) (Year: 2016).*
Spooner-Hart PhD thesis "Investigations on Essential Oils of Selected Australian Flora, in Particular Those Containing β-Triketones, for Activity Against Arthropods", Mar. 2013 (Year: 2013).*
Examination Report from related AU Patent Application No. 2018295576, dated May 22, 2020.
May, P. 'New β-triketone insecticides offer novel mode of action to control resistant insects', *International Pest Control*, Nov.-Dec. 2016, vol. 58, iss. 6, pp. 310-311.
Fang, F. et al., In vitro activity of ten essential oils against *Sarcoptes scabiei*, *Parasites & Vectors*, 2016, vol. 9, article No. 594, pp. 1-7.
Bett, P. K. et al., 'Chemical composition of *Cupressus lusitanica* and *Eucalyptus saligna* leaf essential oils and bioactivity against major insect pests of stored food grains'. *Industrial Crops and Products*, 2016, vol. 82, pp. 51-62.
Thomas, J. et al., 'Evaluation of Repellent Properties of Volatile Extracts From the Australian Native Plant *Kunzea ambigua* Against *Aedes aegypti* (Diptera: Culcidae)', *Journal of Medical Entymology*, 2009, vol. 46, iss. 6, pp. 1387-1391.
Greene, T. et al. 'Antiparasitic behavior in New Zealand parakeets', *NOTORNIS Journal of the Ornithological Society of New Zealand*, Dec. 1989, vol. 36, part 4, pp. 322-323.
Costa, A.A., et al., 2017 "Repellent and Larvicidal Activity of the Essential Oil From *Eucalyptus nitens* Against *Aedes aegypti* and *Aedes albopictus* (Diptera: Culicidae)," Journal of Medical Entomology, 54(3): 670-676.
International Search Report in International Application No. PCT/AU2018/050704, dated Aug. 27, 2018.
Jeong, E-Y, et al., 2008 "Acaricidal Activity of Triketone Analogues Derived from Leptospermum Scoparium Oil Against House-Dust and Stored-Food Mites," *Pest Management Science*, 65(3): 327-331.
Written Opinion in International Application No. PCT/AU2018/050704, dated Aug. 27, 2018.

* cited by examiner

*Primary Examiner* — Yevgeny Valenrod
(74) *Attorney, Agent, or Firm* — Knobbe, Martens, Olson & Bear, LLP

(57) ABSTRACT

The present invention relates to methods of controlling pesticide resistant pests comprising exposing the pesticide resistant pests to a pest controlling amount of a triketone compound.

15 Claims, 5 Drawing Sheets

CONTROL OF RESISTANT PESTS

FIELD OF THE INVENTION

The present invention relates to methods of controlling pesticide resistant pests comprising exposing the pesticide resistant pests to a pest controlling amount of a triketone compound of formula (I).

BACKGROUND OF THE INVENTION

Pesticide resistance is a significant agricultural problem and the incidence of pesticide resistance is increasing. In the 1940s, farmers in the USA lost about 7% of crops to pests and this increased to 13% in the 1980s and 1990s even though more pesticides were available. It has been estimated that up to 1000 pest species have developed resistance to one or more pesticides since 1945.

An example is grain protectants. Grain protectants are pesticides applied to grains that are to be stored to prevent damage from pest species such as the lesser grain borer (*Rhyzopertha dominica* (F.), the rice weevil (*Sitophilus oryzae* (L.), the rust red flour beetle (*Tribolium castaneum* (Herbst)), the saw toothed grain beetle (*Oryzaephilus suranamensis* (L.) and the flat grain beetle (*Cryptolestes ferrugineus* (Stephens)). Grain protectants have been used for several decades and resistance is now a problem. (Daglish, 2008, J Stored Products Research, 44:71-76). For example, in many States of Australia, the lesser grain borer cannot be controlled with any organophosphate or synthetic pyrethroid and resistance to the insect growth regulator methoprene is becoming common (Daglish, et al. 2013, J Stored Products Research, 54:71-76). Organophosphate resistance is also common in the saw toothed beetle.

Pesticide resistance may also occur in pests that infest agriculturally useful animals such as cattle. For example, cattle ticks are serious pests in cattle throughout tropical and sub-tropical areas of the world. Infestations cause high production losses through weight loss, reduced milk yields and hide damage. The cattle tick may also transmit tick fever organisms such as *Babesia* and *Anaplasma*, which can cause high morbidity amongst susceptible animals.

Control of ticks is usually done using an integrated pest management system, where treatment using more than one pesticide occurs. However, to reduce development of resistance, more options for pesticides, particularly those with varying mechanisms of action, are required.

The present invention is predicated, at least in part, by the discovery that flavesone, a potassium channel activator, is effective in controlling pesticide resistant pests, particularly agriculturally important pests that have developed resistance to commonly used pesticides, such as stored grain pests and cattle ticks and flies.

SUMMARY OF THE INVENTION

In one aspect of the invention, there is provided a method of controlling pesticide resistant pests comprising exposing the pesticide resistant pests to a compound of formula (I)

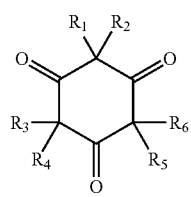

wherein $R_1$ is selected from —C(=O)$R_7$, —O$R_8$, —S$R_8$, —C$_{1-10}$hydroxyalkyl, —N$R_9R_{10}$, —C(=N—$R_9$)$R_7$, —C(=N—OH)$R_7$, —NO, —NO$_2$, —N(O$R_8$)$R_7$ and —OSO$_3R_8$;

$R_2$ is selected from hydrogen, —C$_{1-10}$alkyl, —C$_{2-10}$alkenyl, aryl and heteroaryl;

$R_3$, $R_4$, $R_5$ and $R_6$ are each independently selected from hydrogen, —C$_{1-10}$alkyl, —C$_{3-6}$cycloalkyl, —C$_{2-10}$alkenyl, —C$_{1-10}$haloalkyl, —C$_{1-10}$dihaloalkyl, —C$_{1-10}$trihaloalkyl, —O$R_8$, —S$R_8$, —N$R_9R_{10}$, —C(=N—$R_9$)$R_7$, —NO, —NO$_2$, —N$R_9$O$R_8$, —OSO$_3R_8$, —C$_{1-10}$alkylaryl and —C(=O)$R_7$;

$R_7$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl, —C$_{1-10}$nitroalkyl, —C$_{1-3}$alkylOC$_{1-3}$alkyl, —C$_{1-3}$alkylOC$_{1-3}$haloalkyl, —C$_{1-3}$alkylOC$_{1-3}$dihaloalkyl, —C$_{1-3}$alkylOC$_{1-3}$trihaloalkyl, —O$R_8$, —S$R_8$ and —N$R_9R_{10}$;

$R_8$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl and —C$_{1-10}$nitroalkyl;

$R_9$ and $R_{10}$ are independently selected from hydrogen, —C$_{1-10}$alkyl, —C$_{2-10}$alkylaryl, —C$_{3-6}$cycloalkyl, —C$_{2-10}$alkenyl, —C$_{2-10}$alkylheteroaryl, —C$_{1-10}$haloalkyl, —C$_{1-10}$dihaloalkyl, —C$_{1-10}$trihaloalkyl; or a tautomer thereof.

In another aspect of the present invention, there is provided a method of treating or preventing a pest infestation or infection in a livestock animal or a companion animal comprising applying to the animal an effective amount of a compound of formula (I)

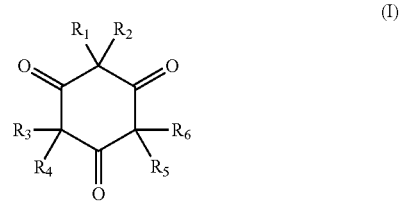

wherein $R_1$ is selected from —C(=O)$R_7$, —O$R_8$, —S$R_8$, —C$_{1-10}$hydroxyalkyl, —N$R_9R_{10}$, —C(=N—$R_9$)$R_7$, —C(=N—OH)$R_7$, —NO, —NO$_2$, —N(O$R_8$)$R_7$ and —OSO$_3R_8$;

$R_2$ is selected from hydrogen, —C$_{1-10}$alkyl, —C$_{2-10}$alkenyl, aryl and heteroaryl;

$R_3$, $R_4$, $R_5$ and $R_6$ are each independently selected from hydrogen, —C$_{1-10}$alkyl, —C$_{3-6}$cycloalkyl, —C$_{2-10}$alkenyl, —C$_{1-10}$haloalkyl, —C$_{1-10}$dihaloalkyl, —C$_{1-10}$trihaloalkyl, —O$R_8$, —S$R_8$, —N$R_9R_{10}$, —(C=N—$R_9$)$R_7$, —NO, —NO$_2$, —N$R_9$O$R_8$, —OSO$_3R_8$, —C$_{1-10}$alkylaryl and —C(=O)$R_7$;

$R_7$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl, —C$_{1-10}$nitroalkyl, —C$_{1-3}$alkylOC$_{1-3}$alkyl, —C$_{1-3}$alkylOC$_{1-3}$haloalkyl, —C$_{1-3}$alkylOC$_{1-3}$dihaloalkyl, —C$_{1-3}$alkylOC$_{1-3}$trihaloalkyl, —O$R_8$, —S$R_8$ and —N$R_9R_{10}$;

$R_8$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl and —C$_{1-10}$nitroalkyl;

R$_9$ and R$_{10}$ are independently selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl; or a tautomer thereof;

the pest infestation is caused by a population of pests comprising pesticide resistant pests.

In yet another aspect of the present invention, there is provided a method of controlling a population of pests comprising applying a compound of formula (I)

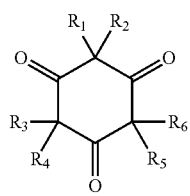

(I)

wherein R$_1$ is selected from —C(═O)R$_7$, —OR$_8$, —SR$_8$, —C$_{1-10}$hydroxyalkyl, —NR$_9$R$_{10}$, —C(═N—R$_9$)R$_7$, —C(═N—OH)R$_7$, —NO, —NO$_2$, —N(OR$_8$)R$_7$ and —OSO$_3$R$_8$;

R$_2$ is selected from hydrogen, —C$_{1-10}$alkyl, —C$_{2-10}$alkenyl, aryl and heteroaryl;

R$_3$, R$_4$, R$_5$ and R$_6$ are each independently selected from hydrogen, —C$_{1-10}$alkyl, —C$_{3-6}$cycloalkyl, —C$_{2-10}$alkenyl, —C$_{1-10}$haloalkyl, —C$_{1-10}$dihaloalkyl, —C$_{1-10}$trihaloalkyl, —OR$_8$, —SR$_8$, —NR$_9$R$_{10}$, —C(═N—R$_9$)R$_7$, —NO, —NO$_2$, —NR$_9$OR$_8$, —OSO$_3$R$_8$, —C$_{1-10}$alkylaryl and —C(═O)R$_7$;

R$_7$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl, —C$_{1-10}$nitroalkyl, —C$_{1-3}$alkylOC$_{1-3}$alkyl, —C$_{1-3}$alkylOC$_{1-3}$haloalkyl, —C$_{1-3}$alkylOC$_{1-3}$dihaloalkyl, —C$_{1-3}$alkylOC$_{1-3}$trihaloalkyl, —OR$_8$, —SR$_8$ and —NR$_9$R$_{10}$;

R$_8$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl and —C$_{1-10}$nitroalkyl;

R$_9$ and R$_{10}$ are independently selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl; or a tautomer thereof;

to an environment infested with or potentially infested with the population of pests; wherein the population of pests comprises pesticide resistant pests.

In a further aspect of the present invention, there is provided a method of protecting stored plant part from pest infestation comprising contacting the plant part with a compound of formula (I)

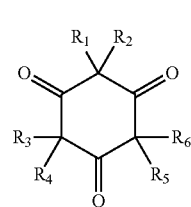

(I)

wherein R$_1$ is selected from —C(═O)R$_7$, —OR$_8$, —SR$_8$, —C$_{1-10}$hydroxyalkyl, —NR$_9$R$_{10}$, —C(═N—R$_9$)R$_7$, —C(═N—OH)R$_7$, —NO, —NO$_2$, —N(OR$_8$)R$_7$ and —OSO$_3$R$_8$;

R$_2$ is selected from hydrogen, —C$_{1-10}$alkyl, —C$_{2-10}$alkenyl, aryl and heteroaryl;

R$_3$, R$_4$, R$_5$ and R$_6$ are each independently selected from hydrogen, —C$_{1-10}$alkyl, —C$_{3-6}$cycloalkyl, —C$_{2-10}$alkenyl, —C$_{1-10}$haloalkyl, —C$_{1-10}$dihaloalkyl, —C$_{1-10}$trihaloalkyl, —OR$_8$, —SR$_8$, —NR$_9$R$_{10}$, —C(═N—R$_9$)R$_7$, —NO, —NO$_2$, —NR$_9$OR$_8$, —OSO$_3$R$_8$, —C$_{1-10}$alkylaryl and —C(═O)R$_7$;

R$_7$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl, —C$_{1-10}$nitroalkyl, —C$_{1-3}$alkylOC$_{1-3}$alkyl, —C$_{1-3}$alkylOC$_{1-3}$haloalkyl, —C$_{1-3}$alkylOC$_{1-3}$dihaloalkyl, —C$_{1-3}$alkylOC$_{1-3}$trihaloalkyl, —OR$_8$, —SR$_8$ and —NR$_9$R$_{10}$;

R$_8$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl and —C$_{1-10}$nitroalkyl;

R$_9$ and R$_{10}$ are independently selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl; or a tautomer thereof.

wherein the pest infestation is caused by a population of pests comprising pesticide resistant pests.

DETAILED DESCRIPTION OF THE INVENTION

Unless otherwise defined, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "an element" means one element or more than one element.

As used herein, the term "about" refers to a quantity, level, value, dimension, size, or amount that varies by as much as 30%, 25%, 20%, 15% or 10% to a reference quantity, level, value, dimension, size, or amount.

Except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The term "combination" as used herein refers to the compound of formula (I) and at least one second pesticide being used simultaneously in a single composition or separate compositions or sequentially in separate compositions, such that the biological activity of each of the compounds in the insect overlaps or occurs at the same time.

The term "controlling" as used herein refers to preventing infestation with pests, repelling pests from an environment, combatting, eradicating or destroying pests, including increasing the mortality of the pests or inhibiting the growth and/or development of the pests or interrupting reproduction in the pests.

As used herein, the term "environment" refers to an environment in which the compound of formula (I) may be applied to ensure the pesticide resistant pest is exposed to the compound or to an environment in which the compound of formula (I) may be applied because it is a potential environment for infestation by a pesticide resistant pest. The environment may be an agricultural environment, a household environment, an industrial environment or another environment that hosts or potentially hosts the resistant pests. The agricultural environment includes environments for growing crops, trees or other plants of commercial importance that may be susceptible to a pesticide resistant pest infestation. The agricultural environment includes not only the plant itself but also the soil and area around the plants as they grow, and areas where plants or parts of plants, for examples, seeds, grains, leaves, roots or fruit, may be stored. The agricultural environment may also be an environment where a commercially important livestock animal is maintained, for example, a paddock, a barn, holding pens or milking sheds. A household environment includes environments inhabited by humans or animals such as companion animals and may include an indoor environment, such as carpets, curtains, cupboards, bed and bedding, animal beds or blankets, or the air inside a house. A household environment may also include an outdoor environment such as a domestic garden or an animal shelter such as a hutch or a kennel. An industrial environment includes environments which are used for industrial purposes such as manufacture, storage or vending or products. Industrial environments include warehouses, manufacturing facilities, shops, storage facilities and the like, including pet shops, plant nurseries and grain storage facilities. Other environments may include leisure areas such as parks, stadiums, show grounds or water areas such as rivers, lakes, ponds or other places water may collect or be slow moving or stagnant.

As used herein, the term "alkyl" refers to a straight chain or branched saturated hydrocarbon group having 1 to 10 carbon atoms. Where appropriate, the alkyl group may have a specified number of carbon atoms, for example, $C_{1-6}$alkyl which includes alkyl groups having 1, 2, 3, 4, 5 or 6 carbon atoms in a linear or branched arrangement. Examples of suitable alkyl groups include, but are not limited to, methyl, ethyl, n-propyl, i-propyl, n-butyl, i-butyl, t-butyl, n-pentyl, 2-methylbutyl, 3-methylbutyl, 4-methylbutyl, n-hexyl, 2-methylpentyl, 3-methylpentyl, 4-methylpentyl, 5-methylpentyl, 2-ethylbutyl, 3-ethylbutyl, heptyl, octyl, nonyl and decyl.

As used herein, the term "alkenyl" refers to a straight-chain or branched hydrocarbon group having one or more double bonds between carbon atoms and having 2 to 10 carbon atoms. Where appropriate, the alkenyl group may have a specified number of carbon atoms. For example, $C_2$-$C_6$ as in "$C_2$-$C_6$alkenyl" includes groups having 2, 3, 4, 5 or 6 carbon atoms in a linear or branched arrangement. Examples of suitable alkenyl groups include, but are not limited to, ethenyl, propenyl, isopropenyl, butenyl, butadienyl, pentenyl, pentadienyl, hexenyl, hexadienyl, heptenyl, octenyl, nonenyl and decenyl.

As used herein, the term "cycloalkyl" refers to a saturated cyclic hydrocarbon. The cycloalkyl ring may include a specified number of carbon atoms. For example, a 3 to 6 membered cycloalkyl group includes 3, 4, 5 or 6 carbon atoms. Examples of suitable cycloalkyl groups include, but are not limited to, cyclopropyl, cyclobutyl, cyclopentyl and cyclohexyl.

As used herein, the term "aryl" is intended to mean any stable, monocyclic, bicyclic or tricyclic carbon ring system of up to 7 atoms in each ring, wherein at least one ring is aromatic. Examples of such aryl groups include, but are not limited to, phenyl, naphthyl, tetrahydronaphthyl, indanyl, fluorenyl, phenanthrenyl, biphenyl and binaphthyl.

The term "heteroaryl" as used herein, represents a stable monocyclic, bicyclic or tricyclic ring of up to 7 atoms in each ring, wherein at least one ring is aromatic and at least one ring contains from 1 to 4 heteroatoms selected from the group consisting of O, N and S. Heteroaryl groups within the scope of this definition include, but are not limited to, acridinyl, carbazolyl, cinnolinyl, quinoxalinyl, quinazolinyl, pyrazolyl, indolyl, isoindolyl, 1H,3H-1-oxoisoindolyl, benzotriazolyl, furanyl, thienyl, thiophenyl, benzothienyl, benzofuranyl, benzodioxane, benzodioxin, quinolinyl, isoquinolinyl, oxazolyl, isoxazolyl, imidazolyl, pyrazinyl, pyridazinyl, pyridinyl, pyrimidinyl, pyrrolyl, tetrahydroquinolinyl, thiazolyl, isothiazolyl, 1,2,3-triazolyl, 1,2,4-triazolyl, 1,2,4-oxadiazolyl, 1,2,4-thiadiazolyl, 1,3,5-triazinyl, 1,2,4-triazinyl, 1,2,4,5-tetrazinyl and tetrazolyl. Particular heteroaryl groups have 5- or 6-membered rings, such as pyrazolyl, furanyl, thienyl, oxazolyl, indolyl, isoindolyl, 1H,3H-1-oxoisoindolyl, isoxazolyl, imidazolyl, pyrazinyl, pyridazinyl, pyridinyl, pyrimidinyl, pyrrolyl, thiazolyl, isothiazolyl, 1,2,3-triazolyl, 1,2,4-triazolyl and 1,2,4-oxadiazolyl and 1,2,4-thiadiazolyl.

The term "haloalkyl" as used herein refers to an alkyl group in which one or more hydrogen atoms of the alkyl group is replaced with a halo atom. Where appropriate, the alkyl group may have a specified number of carbon atoms, for example, $C_{1-6}$haloalkyl which includes haloalkyl groups having 1, 2, 3, 4, 5 or 6 carbon atoms in a linear or branched arrangement. Examples of haloalkyl groups include fluoromethyl, difluoromethyl, trifluoromethyl, 1-fluoroethyl, 2-fluoroethyl, 1,1-difluoroethyl, 2,2-fluoroethyl, 1,1,2-trifluoroethyl, 2,2,2-trifluoroethyl, 3-fluoropropyl, 3,3-difluoropropyl, 3,3,3-trifluoropropyl, 4-fluorobutyl, 4,4-difluorobutyl, 4,4,4-trifluorobutyl, 5-fluoropentyl, 5,5-difluoropentyl, 5,5,5-trifluoropentyl, 6-fluorohexyl, 6,6-difluorohexyl or 6,6,6-trifluorohexyl, chloromethyl, dichloromethyl, trichloromethyl, 1-chloroethyl, 2-chloroethyl, 1,1-dichloroethyl, 2,2-chloroethyl, 1,1,2-trichloroethyl, 2,2,2-trichloroethyl, 3-chloropropyl, 3,3-dichloropropyl, 3,3,3-trichloropropyl, 4-chlorobutyl, 4,4-dichlorobutyl, 4,4,4-trichlorobutyl, 5-chloropentyl, 5,5-dichloropentyl, 5,5,5-trichloropentyl, 6-chlorohexyl, 6,6-dichlorohexyl or 6,6,6-trichlorohexyl, bromomethyl, dibromomethyl, tribromomethyl, 1-bromoethyl, 2-bromoethyl, 1,1-dibromoethyl, 2,2-dibromoethyl, 1,1,2-tribromoethyl, 2,2,2-tribromoethyl, 3-bromopropyl, 3,3-dibromopropyl, 3,3,3-tribromopropyl, 4-bromobutyl, 4,4-dibromobutyl, 4,4,4-tribromobutyl, 5-bromopentyl, 5,5-dibromopentyl, 5,5,5-tribromopentyl, 6-bromohexyl, 6,6-dibromohexyl or 6,6,6-tribromohexyl and the like.

"Halo" as used herein refers to fluoro, chloro, bromo and iodo.

The terms "hydroxyalkyl", "thioalkyl" and "nitroalkyl" each refer to an alkyl group as defined above in which one hydrogen atom has been replaced by a hydroxyl group, a thiol group or a nitro group respectively.

The term "alkoxy" as used herein refers to an oxygen substituent that is substituted with an alkyl group as defined above. Examples of suitable alkoxy groups include, but are not limited to, —OCH$_3$, —OCH$_2$CH$_3$, —O(CH$_2$)$_2$CH$_3$, —OCH(CH$_3$)$_2$, —O(CH$_2$)$_3$CH$_3$, —OCH$_2$CH(CH$_3$)$_2$, —OC(CH$_3$)$_3$, —O(CH$_2$)$_4$CH$_3$ and —O(CH$_2$)$_5$(CH$_3$).

The compounds of formula (I) may exist in a number of tautomeric forms. For example, tautomerism is shown in the scheme below:

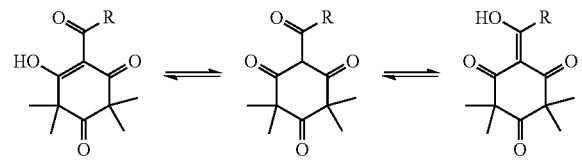

It is intended that all such tautomeric structures are included with in the scope of formula (I).

It is also possible that the compounds for formula (I) may exist in stereoisomeric form. The compounds may be enantiomers or diastereomers and may be present as an individual isomer or in mixture form, including racemic mixtures.

By "pesticide resistant pest", it is meant a pest such as an insect or arachnid that has developed resistance to one or more pesticides that have previously been used to control them. The pesticide resistant pest may be present in a population of pests. For example, the Tiaro strain of *R. microplus* has a resistance profile of about 30% fluozuron, 60.6% cypermethrin, 57.6% flumetron, 16.2% amitraz (amidine), 11.3% DDT, 9.3% chlorpyrifos and 2.4% dieldrin resistance.

METHOD OF THE INVENTION

In one aspect, the present invention provides a method of controlling a pesticide resistant pest comprising exposing the pesticide resistant pest to a compound of formula (I):

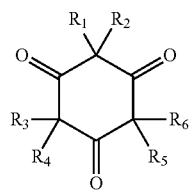

(I)

wherein $R_1$ is selected from —C(=O)R$_7$, —OR$_8$, —SR$_8$, —C$_{1-10}$hydroxyalkyl, —NR$_9$R$_{10}$, —C(=N—R$_9$)R$_7$, —C(=N—OH)R$_7$, —NO, —NO$_2$, —N(OR$_8$)R$_7$ and —OSO$_3$R$_8$;

$R_2$ is selected from hydrogen, —C$_{1-10}$alkyl, —C$_{2-10}$alkenyl, aryl and heteroaryl;

$R_3$, $R_4$, $R_5$ and $R_6$ are each independently selected from hydrogen, —C$_{1-10}$alkyl, —C$_{3-6}$cycloalkyl, —C$_{2-10}$alkenyl, —C$_{1-10}$haloalkyl, —C$_{1-10}$dihaloalkyl, —C$_{1-10}$trihaloalkyl, —OR$_8$, —SR$_8$, —NR$_9$R$_{10}$, —C(=N—R$_9$)R$_7$, —NO, —NO$_2$, —NR$_9$OR$_8$, —OSO$_3$R$_8$, —C$_{1-10}$alkylaryl and —C(=O)R$_7$;

$R_7$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl, —C$_{1-10}$nitroalkyl, —C$_{1-3}$alkylOC$_{1-3}$alkyl, —C$_{1-3}$alkylOC$_{1-3}$haloalkyl, —C$_{1-3}$alkylOC$_{1-3}$dihaloalkyl, —C$_{1-3}$alkylOC$_{1-3}$trihaloalkyl, —OR$_8$, —SR$_8$ and —NR$_9$R$_{10}$;

$R_8$ is selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl, —C$_{1-10}$haloalkoxy, —C$_{1-10}$hydroxyalkyl, —C$_{1-10}$thioalkyl and —C$_{1-10}$nitroalkyl;

$R_9$ and $R_{10}$ are independently selected from hydrogen, —C$_{1-10}$alkyl, —C$_{2-10}$alkylaryl, —C$_{3-6}$cycloalkyl, —C$_{2-10}$alkenyl, —C$_{1-10}$alkylheteroaryl, —C$_{1-10}$haloalkyl, —C$_{1-10}$dihaloalkyl, —C$_{1-10}$trihaloalkyl; or a tautomer thereof.

In some embodiments, the compound of formula (I) is a compound of formula (II)

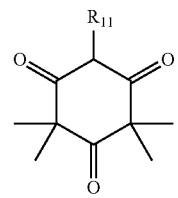

(II)

wherein $R_{11}$ is selected from —CR$_{12}$R$_{13}$R$_{14}$ or —NR$_{15}$R$_{16}$;
one of $R_{12}$ and $R_{13}$ is hydrogen and the other is hydroxyl or —OCR$_{17}$R$_{18}$R$_{19}$ or $R_{12}$ and $R_{13}$ together form an oxo group (=O) or a =N—OH group;
$R_{14}$ is —CH(CH$_3$)CR$_{20}$R$_{21}$R$_{22}$, —CH$_2$CH(CH$_3$)CR$_{20}$R$_{21}$R$_{22}$ or —CH(CH$_3$)CH$_2$CR$_{20}$R$_{21}$R$_{22}$;
$R_{15}$ and $R_{16}$ are independently selected from hydrogen and C$_{1-10}$alkyl;
$R_{17}$, $R_{18}$ and $R_{19}$ are independently selected from hydrogen or halo; and
$R_{20}$, $R_{21}$ and $R_{22}$ are independently selected from hydrogen, hydroxyl, halo, NO$_2$ and —OCR$_{17}$R$_{18}$R$_{19}$; or a tautomer thereof.

In some embodiments, the compound of formula (I) is a compound of formula (III):

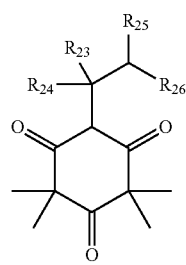

(III)

wherein one of $R_{23}$ and $R_{24}$ is hydrogen and the other is hydroxyl or —$OCR_{27}R_{28}R_{29}$ or $R_{23}$ and $R_{24}$ together form an oxo group (=O);

$R_{25}$ is —$CR_{30}R_{31}R_{32}$, -$CH_2CR_{30}R_{31}R_{32}$ or —$CH(CH_3)CR_{30}R_{31}R_{32}$;

$R_{26}$ is H or —$CH_3$; wherein where $R_{26}$ is H, $R_{25}$ is —$CH(CH_3)CR_{30}R_{31}R_{32}$;

$R_{27}$, $R_{28}$ and $R_{29}$ are independently selected from hydrogen or halo; and $R_{30}$, $R_{31}$ and $R_{32}$ are independently selected from hydrogen, hydroxyl, halo, $NO_2$, and —$OCR_5R_6R_7$; or a tautomer thereof.

In some embodiments, the compound of formula (I) is selected from:

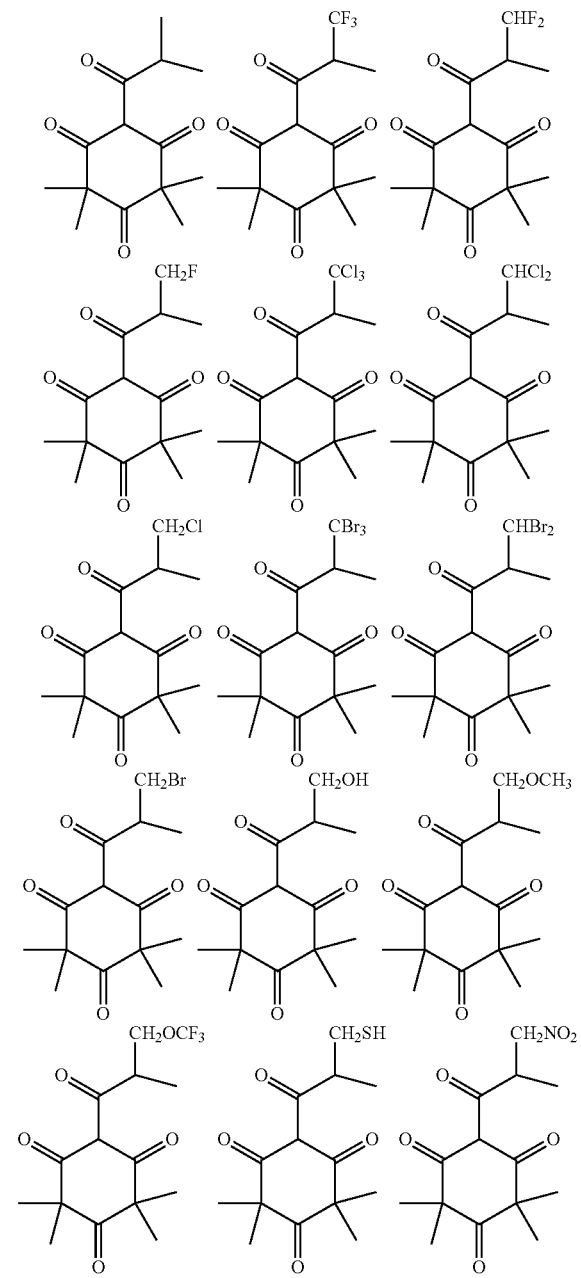

-continued

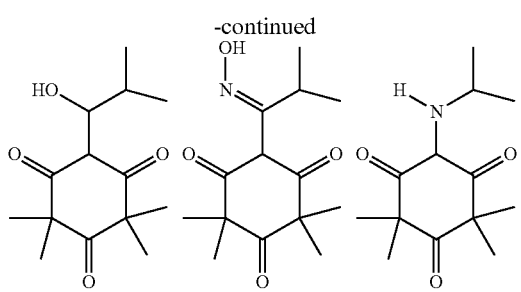

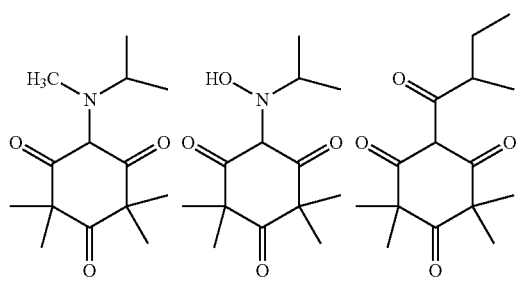

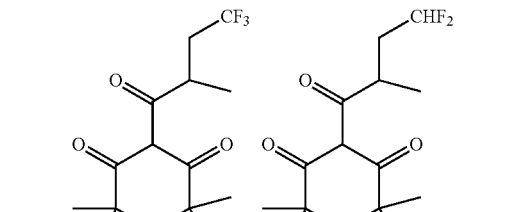

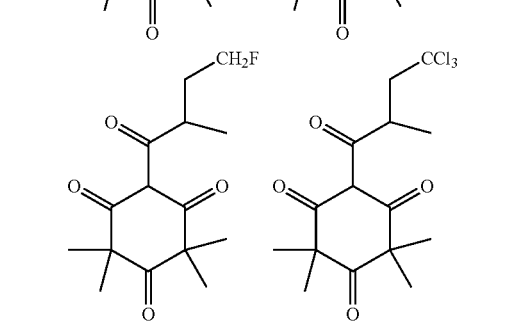

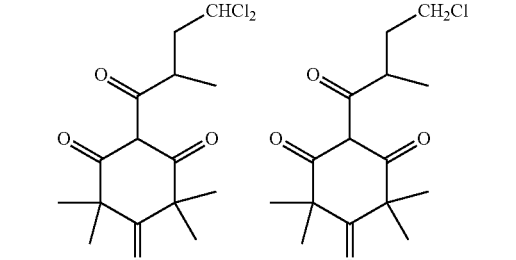

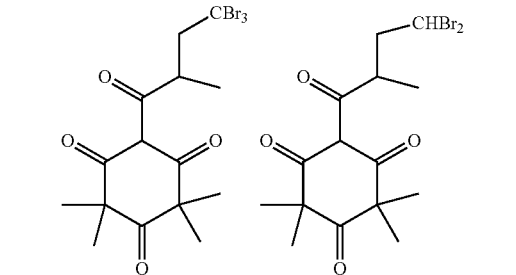

-continued
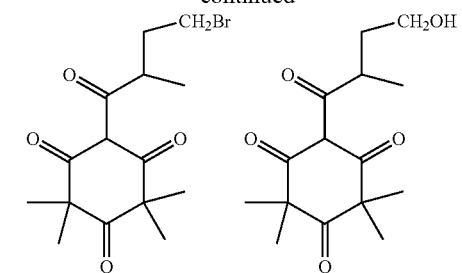
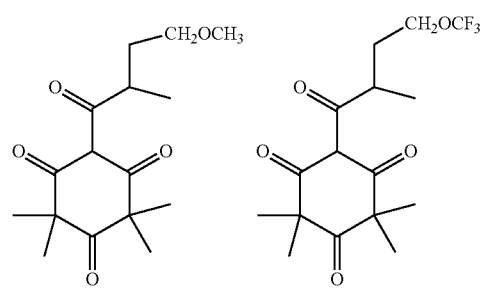
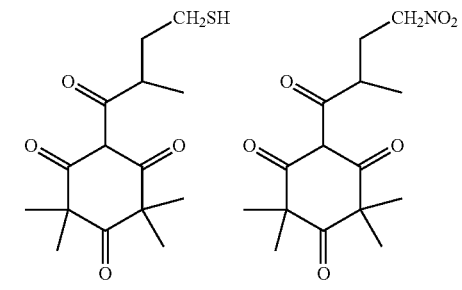
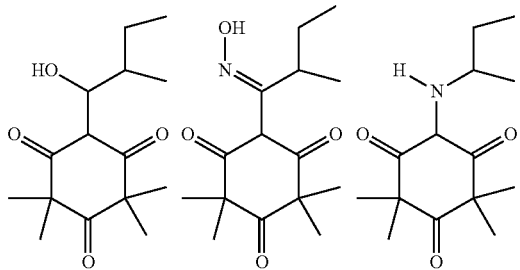
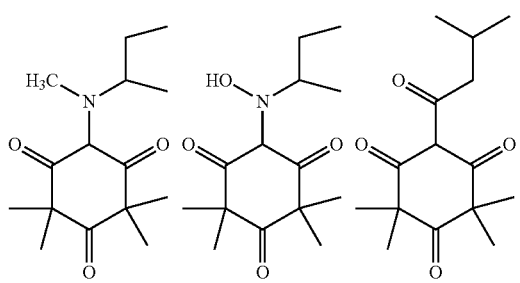
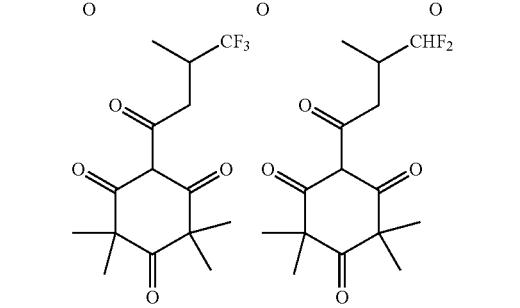
-continued
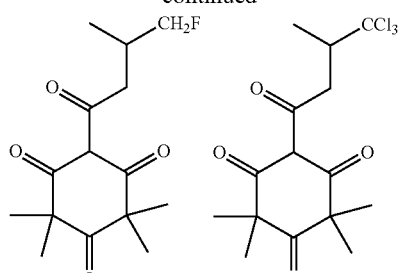
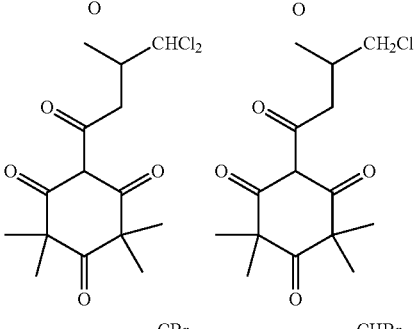
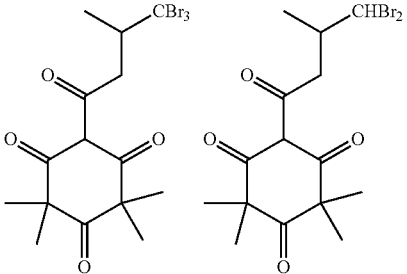
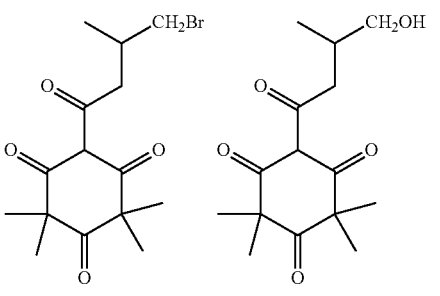
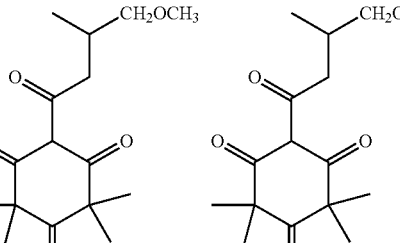
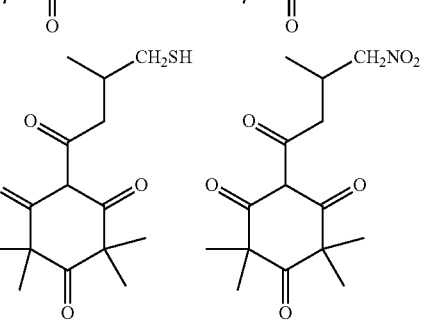

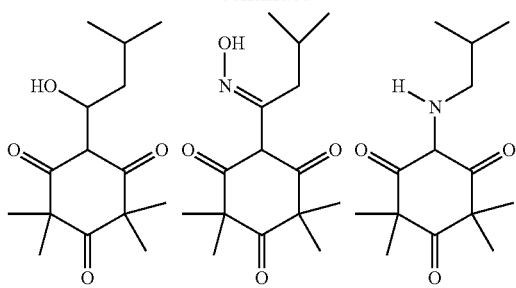

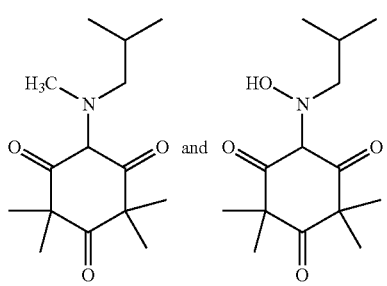

or a tautomer thereof.

In particular embodiments, the compound of formula (I) is selected from flavesone (1-isobutyroyl-3,3,5,5-tetramethylcyclohexane-2,4,6-trione):

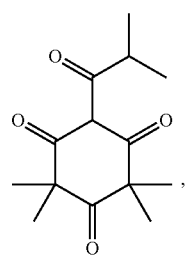

leptospermone (1-valeroyl-3,3,5,5-tetramethylcyclohexane-2,4,6-trione):

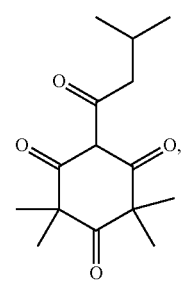

or isoleptospermone (1-isovaleroyl-3,3,5,5-tetramethylcyclohexane-2,4,6-trione):

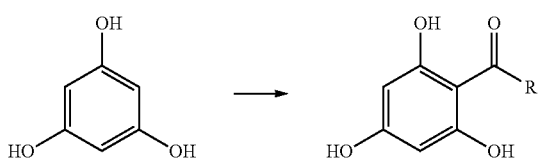

especially flavesone.

The compounds of formula (I) may be isolated from oil bearing trees such as trees from the *Myrtaceae* family such as *Leptospermum scoparium* or *Eucalyptus grandis* or *Eucalyptus cloeziana*, especially *Leptospermum scoparium*.

In other embodiments, the compound of formula (I) may be prepared synthetically, for example, as described in WO 2002/089587. In one method, 1,3,5-trihydroxybenzene may be reacted with RCN in the presence of zinc chloride (Blatt, Org. Synth. Col 11, 1943, 522-523) as shown in Scheme 1:

Scheme 1

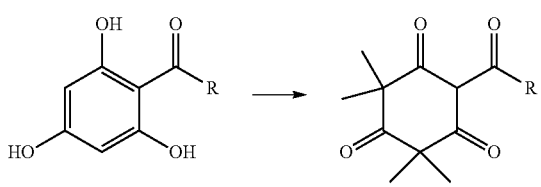

Anhydrous methyl iodide (6 Eq) is slowly added to the 1-acyl-2,4,6-trihydroxybenzene (1 eq) and sodium ethoxide (6 eq) in anhydrous methanol as shown in Scheme 2 to afford the 1-acyl-3,3,5,5-tetramethyl-2,4,6-cyclohexatrione (U.S. Pat. No. 4,202,840).

Scheme 2

The effective amount of compound of formula (I) will depend on whether the compound is being applied to the pests themselves or to an environment or livestock animal or companion animal or a plant part and will also depend on the identity of the pesticide resistance pest. Typically, an effective amount will fall within the range of 0.1 ppm to about 500,000 ppm, especially 1 to 200,000 ppm or 1 to 100,000 ppm. In some embodiments where direct exposure of the pest to the compound of formula (I) occurs, the effective amount may be in the range of 10 and 10,000 ppm or 100 and 10,000 ppm or 100 and 5000 ppm, especially 300 and 5000 ppm or 500 and 5000 ppm, more especially 800 ppm to 2,500 ppm or 900 ppm to 2,000 ppm. In some embodiments, the effective amount may be between 100 and 1000 ppm, for example, 200 to 800 ppm or 300 to 600 ppm. In other embodiments, the effective amount may be between 600 and 5000 ppm, especially 1000 and 2500 ppm. In some embodiments, the effective amount is between 20 and 100 ppm, especially 25 and 80 ppm. An effective amount to apply to an environment, such as grain in a grain store, may be in the range of 20 ppm to 100 ppm, especially 50 ppm to 100 ppm.

In some embodiments, the pests are insects that are resistant to one or more insecticides. In other embodiments, the pests are arachnids that are resistant to one or more arachnicides. In some embodiments, the pests are a population of insects comprising insects resistant to one or more insecticides or a population of arachnids comprising arachnids resistant to one or more arachnicides.

The insects or populations of insects comprising insects resistant to one or more insecticides include insects such as:

(a) from the order of the lepidopterans (Lepidoptera), for example, *Adoxophyes orana, Agrotis ipsilon, Agrotis segetum, Alabama argillacea, Anticarsia gemmatalis, Argyresthia conjugella, Autographa gamma, Cacoecia murinana, Capua reticulana, Choristoneura fumiferana, Chilo partellus, Choristoneura occidentalis, Cirphis unipuncta, Cnaphalocrocis medinalis, Crocidolomia binotalis, Cydia pomonella, Dendrolimus pini, Diaphania nitidalis, Diatraea grandiosella, Earias insulana, Elasmopalpus lignosellus, Eupoecilia ambiguella, Feltia subterranea, Grapholitha funebrana, Grapholitha molesta, Heliocoverpa armigera, Heliocoverpa virescens, Heliocoverpa zea, Hellula undalis, Hibernia defoliaria, Hypliantria cunea, Hyponomeuta malinellus, Keiferia lycopersicella, Lambdina fiscellaria, Laphygma exigua, Leucoptera scitella, Lithocolletis blancardella, Lobesia botrana, Loxostege sticticalis, Lymantria dispar, Lymantria monacha, Lyonetia clerkella, Manduca sexta, Malacosoma neustria, Mamestra brassicae, Mocis repanda, Operophthera brumata, Orgyia pseudotsugata, Ostrinia nubilalis, Pandemis heparana, Panolis flammea, Pectinophora gossypiella, Phthorimaea operculella, Phyllocnistis citrella, Pieris brassicae, Plathypena scabra, Platynota stultana, Plutella xylostella, Prays citri, Prays oleae, Prodenia sunia, Prodenia ornithogalli, Pseudoplusia includens, Rhyacionia frustrana, Scrobipalpula absoluta, Sesamia inferens, Sparganothis pilleriana, Spodoptera frugiperda, Spodoptera littoralis, Spodoptera litura, Syllepta derogata, Synanthedon myopaeforinis, Thaumatopoea pityocampa, Tortrix viridana, Trichoplusia ni, Tryporyza incertulas* and *Zeiraphera canadensis*, also *Galleria mellonella, Sitotroga cerealella, Ephestia cautella* and *Tineola bisselliella*;

(b) from the order of the beetles (Coleoptera), for example, *Anthonomus grandis, Anthonomus pomorum, Apion vorax, Atomaria linearis, Blastophagus piniperda, Cassida nebulosa, Cerotoma trifurcata, Ceuthorhynchus assimilis, Ceuthorhynchus napi, Chaetocnema tibialis, Conoderus vespertinus, Crioceris asparagi, Cryptolestes ferrugineus, Dendroctonus rufipennis, Diabrotica longicornis, Diabrotica punctata, Diabrotica virgifera, Epilachna varivestis, Epitrix hirtipennis, Eutinobothrus brasiliensis, Hylobius abietis, Hypera brunneipennis, Hypera postica, Ips typographus, Lema bilineata, Lema melanopus, Leptinotarsa decemlineata, Limonius califomicus, Lissorhoptrus oryzophilus, Melanotus communis, Meligethes aeneus, Melolontha hippocastani, Melolontha melolontha, Oulema oryzae, Otiorhynchus sulcatus, Otiorhynchus ovatus, Phaedon cochleariae, Phyllopertha horticola, Phyllophaga* sp., *Phyllotreta chrysocephala, Phyllotreta nemorum, Phyllotreta striolata, Popillia japonica, Psylliodes napi, Scolytus intricatus* and *Sitona lineatus*, also *Bruchus rufimanus, Bruchus pisorum, Bruchus lentis, Sitophilus granarius, Lasioderma serricorne, Oryzaephilus surinamensis, Rhyzopertha dominica, Sitophilus oryzae, Tribolium castaneum, Trogoderma granarium* and *Zabrotes subfasciatus*;

(c) from the order of the dipterans (Diptera), for example, *Anastrepha ludens, Ceratitis capitata, Contarinia sorghicola, Dacus cucurbitae, Dacus oleae, Dasineura brassicae, Delia coarctata, Delia radicum, Hydrellia griseola, Hyleniyia platura, Liriomyza sativae, Liriomyza trifolii, Mayetiola destructor, Orseolia oryzae, Oscinella frit, Pegomya hyoscyami, Phorbia antiqua, Phorbia brassicae, Phorbia coarctata, Rhagoletis cerasi* and *Rhagoletis pomonella*, also *Aedes aegypti, Aedes vexans, Aedes albopictus, Anopheles maculipennis, Chrysomya bezziana, Cochliomyia hominivorax, Chrysomya macellaria, Cordylobia anthropophaga, Culex pipiens, Fannia canicularis, Gasterophilus intestinalis, Glossina morsitans, Haematobia irritans, Haplodiplosis equestris, Hypoderma lineata, Lucilia cuprina, Lucilia sericata, Musca domestica, Muscina stabulans, Oestrus ovis, Tabanus bovinus* and *Simulium damnosum*;

(d) from the order of the thrips (Thysanoptera), for example, *Frankliniella fusca, Frankliniella occidentalis, Frankliniella tritici, Haplothrips tritici, Heliothirips haemorrhoidalis, Scirtothrips citri, Thrips oryzae, Thrips palmi* and *Thrips tabaci*;

(e) from the order of the hymenopterans (Hymenoptera), for example, *Athalia rosae, Atta cephalotes, Atta sexdens, Atta texana, Hoplocampa minuta, Hoplocampa testudinea, Iridomyrmex humilis, Iridomyrmex purpureus, Monomorium pharaonic, Solenopsis geminata, Solenopsis invicta, Solenopsis richteri* and *Technomyrmex albipes*;

(f) from the order of the heteropterans (Heteroptera), for example, *Acrosternum hilare, Blissus leucopterus, Cyrtopeltis notatus, Dysdercus cingulatus, Dysdercus intermedius, Eurygaster integriceps, Euschistus ictericus, Leptoglossus phyllopus, Lygus hesperus, Lygus lineolaris, Lygus pratensis, Mormidea pictiventris, Nezara viridula, Piesma quadrata, Solubea insularis* and *Thyanta perditor*;

(g) from the order of the homopterans (Homoptera), for example, *Acyrthosiphon onobrychis, Acyrthosiphon pisum, Adelges laricis, Aonidiella aurantii, Aphidula nasturtii, Aphis fabae, Aphis gossypii, Aphis pomi, Aulacorthum solani, Bemisia tabaci, Brachycaudus cardui, Brevicoryne brassicae, Dalbulus maidis, Dreyfusia nordmannianae, Dreyfusia piceae, Dysaphis radicola, Empoasca fabae, Eriosorna lanigerum, Laodelphax striatella, Macrosiphum avenae, Macrosiphum euphorbiae, Macrosiphum rosae, Megoura viciae, Metopolophium dirhodum, Myzus persicae, Myzus cerasi, Nephotettix cincticeps, Nilaparvata lugens, Perkinsiella saccharicida, Phorodon humuli, Psylla mali, Psylla pyri, Psylla pyricola, Rhopalosiphum maidis, Schizaphis graminum, Sitobion avenae, Sogatella furcifera, Toxoptera citricida, Trialeurodes abutilonea, Trialeurodes vaporariorum* and *Viteus vitifoliae*;

(h) from the order of the termites (Isoptera), for example, *Kalotermes flavicollis, Coptotermes* spp, *Leucotermes flavipes, Macrotermes subhyalinus, Macrotermes darwiniensis, Mastotermes* spp., *Microtermes* spp, *Nasutitermes* spp such as *Nasutitermes walkeri, Odontotermes formosanus, Reticulitermes lucifugus* and *Termes natalensis*;

(i) from the order of the orthopterans (Orthoptera), for example, *Gryllotalpa gryllotalpa, Locusta migratoria, Melanoplus bivittatus, Melanoplus femurrubrum, Melanoplus mexicanus, Melanoplus sanguinipes, Melanoplus spretus, Nomadacris septemfasciata, Schistocerca americana, Schistocerca peregrina, Stauronotus maroccanus* and *Schistocerca gregaria*, also *Acheta domesticus, Blatta orientalis, Blattella germanica* and *Periplaneta americana*;

(j) from the order of the phthirapterans (Phthiraptera), for example, *Mallophaga*, such as *Damalina* spp., and *Anoplura* such as *Linognathus* and *Haematopinus* spp.;

(k) from the order of the hemnipterans (Hemiptera), for example, *Aphis, Bemnisia, Phorodon, Aeneolamia, Empoasca, Perkinsiella, Pyrilla, Aonidiella, Coccus, Pseudococcus, Helopeltis, Lygus, Dysdercus, Oxycarenus, Nezara, Aleyrodes, Triatoma, Psylla, Myzus, Megoura, Phylloxera, Adelges, Nilaparvata, Nephotettix* or *Cimex* spp.;

(l) from the order of the siphonapterans (Siphonaptera), for example, *Ctenocephalides* or *Pulex* spp.;

(m) from the order of the thysanurans (Thysanura), for example, *Lepisina* spp.;

(n) from the order of the dermapterans (Dermaptera), for example, *Forficula* spp.; and (o) from the order of the psocopterans (Psocoptera), for example, *Peripsocus* spp.

The insects may be resistant to one or more insecticides commonly used to control the insect before resistance develops. For example, the insects may be resistant to one or more insecticides selected from:

(i) sodium channel modulators such as a pyrethroid, DDT and methoxychlor. Suitable pyrethroids include acrinathrin, allethrin, bifenthrin, bioallethrin, bioallethrin-S-cyclopentyl, bioresmethrin, cycloprothrin, cyfluthrin, β-cyfluthrin, cyhalothrin, γ-cyhalothrin, λ-cyhalothrin, cypermethrin, α-cypermethrin, β-cypermethrin, θ-cypermethrin, ζ-cypermethrin, cyphenothrin, deltamethrin, dimefluthrin, empenthrin, esfenvalerate, etofenprox, fenpropathrin, fenvalerate, flucythrinate, flumethrin, fluvalinate, tau-fluvalinate, halfenprox, imiprothrin, metofluthrin, permethrin, phenothrin, prallethrin, profluthrin, pyrethrin (pyrethrum), resmethrin, RU15525, silafluofen, tefluthrin, tetramethrin, tralomethrin, transfluthrin and ZX18901.

(ii) acetylcholinesterase (AChE) inhibitors such as a carbamate or an organophosphate. Suitable carbamates include alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb and xylylcarb. Suitable organophosphates include acepahte, azamethiphos, azinphos, azinphos-methyl, azinphos-ethyl, cadusafos, chlorethoxyfos, chlorfenvinfos, chlormephos, chlorpyrifos, chlorpyrifos-methyl, coumaphos, cyanophos, demeton-S-methyl, diazinon, dichlorvos, dicrotophos, dimethoate, dimethylvinphos, disulfoton, ethion, ethoprophos, famphur, fenamiphos, fenitrothion, fenthion, fosthiazate, heptenophos, isofenphos, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos, pirimiphos-methyl, profenfos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(iii) GABA-gated chloride channel antagonists such as an organochloride or a fiprole. Suitable organochlorides include chlordane, endosulfan and α-enosulfun. Suitable fiproles include ethiprole, fipronil, pyrafluprole, and pyriprole.

(iv) nicotinergic acetylcholine receptor agonists such as nicotine or a chloronicotinyl compound. Suitable chloronicotinyl compounds include acetamiprid, clothianidin, dinotefuran, imidacloprid, nitenpyram, thiocloprid and thiamethoxam.

(v) allosteric acetylcholine receptor modulators such a spinetoram or spinosad.

(vi) chloride channel actuators such as abamectin, emamectin benzoate, lepimectin or milbemectin.

(vii) juvenile hormone mimics selected from hydroprene, kinoprene, methoprene, S-methoprene, fenoxycarb or pyriproxyfen.

(viii) homopteran feeding blockers such as pymetrozine or flanicamid.

(ix) mitochondrial ATP synthase inhibitors such as diafenthiuron or tetradifan.

(x) uncouplers of oxidative phosphorylation such as chlorfenapyr or DNOC.

(xi) nicotinic acetylcholine receptor channel blockers such as bensultap, cartap hydrochloride, thiocyclam or thiosultap-sodium.

(xii) inhibitors of chitin biosynthesis such as a benzoylurea or buprofezin. Suitable benzoylureas include bistrifluron, chlorfluazuron, diflubenzuron, flucycloxuron, flufenoxuron, hexaflumuron, lufenuron, novaluron, noviflumuron, penfluron, teflubenzuron or triflumuron.

(xiii) moulting disruptors such as cyromazine.

(xiv) ecdysone receptor agonists or disruptors such as a diacylhydrazine. Suitable diacylhydrazines include chromafenozide, halofenozide, methoxyfenozide or tebufenozide.

(xv) octopamine receptor agonists such as amitraz.

(xvi) mitochondrial complex I electron transport inhibitors such as hydramethylnon, acequinocyl and fluacrypyrim.

(xvii) acetyl CoA carboxylase inhibitors such as a tetronic acid derivative or a tetramic acid derivative. Suitable tetronic acid derivatives include spirodiclofen and spiromesfen and a suitable tetramic acid derivative is spirotetramat.

(xviii) voltage-dependent sodium channel blockers such as indoxacarb or metaflumizone.

(xix) mitochondrial complex IV electron inhibitors such as a phosphine or cyanide. Suitable phosphines include zinc phosphide, aluminium phosphide, calcium phosphide or phosphine.

(xx) mitochondrial complex IV electron transport inhibitors such as cyenopyrafen.

(xxi) ryanodine receptor modulators such as chloranthraniliprole, cyantraniliprole and flubendiamide.

The arachnid populations include spiders, daddy long legs, scorpions, pseudoscorpions, microscopions, mites and ticks, especially mites and ticks (Acarina). Suitable arachnids include:

(i) Mites such as *Aculops lycopersicae, Aculops pelekassi, Aculus Schlechtendali, Balustium medicagoense, Brevipalpus phoenicis, Brevipalpus californicus, Bryobia praetiosa, Bryobia rubrioculus, Bryobia* spp such as clover mite, *Dermanyssus gallinae, Eotetranychus carpini, Eotetranichus lewisi, Eutetranychus banksia, Eutetranychus orientalis, Eriophyes sheldoni, Eryophyes tiliae, Eriophyes inangulis, Eriophyes vitis, Halotydeus destructor* (Redlegged earth mite), *Oligonychus pratensis, Oligonychus coffeae, Oligonitis oryzae, Oligonychus milleri, Panonychus ulmi, Panonychus citri, Penthaleus* Spp such as Blue oat mite *Phyllocoptruta oleivora, Polyphagotarsonemus latus,*

*Psoroptes ovis, Sarcoptes scabiei, Tarsonemus pallidus, Tetranychus cinnabarinus, Tetranychus kanzawai, Tetranychus pacificus* and *Tetranychus urticae*.

(ii) Ticks such as *Amblyomma americanum, Amblyomma variegatum, Argas persicus, Boophilus annulatus, Boophilus decoloratus, Boophilus miccroplus, Dermacentor silvarum, Hyalomma truncatum, Ixodes ricinus, Ixodes rubicundus, Ornithodorus moubata, Otobius megnini, Rhipicephalus apendiculatus, Rhipicephalus evertsi* and *Rhipicephalus microplus*.

The Arachnids may be resistant to one or more arachnicides commonly used to control the arachnid, especially mites or ticks, before resistance develops. For example, the arachnids may be resistant to one or more of the arachnicides or acaricides selected from abamectin, acequinocyl, acrinathrin, aldicarb, alpha-cypermethrin, amidithion, amiton, amitraz, aramite, arsenous oxide, azinphos-ethyl, azinphos-methyl, azobenzene, azocyclotin, azothoate, benomyl, benzoximate, benzylbenzoate, bifenazate, bifenthrin, binapacryl, bromocyclen, bromophos, bromophos-ethyl, bromopropylate, butocarboxim, camphechlor, carbanolate, carbaryl, carbofuran, carbophenothion, carvacrol, chinomethionat, chlorbenside, chlordimeform, chlorfenapyr, chlorfenethol, chlorfenson, chlorfensulphide, chlorfenvinphos, chlorobenzilate, chloromebuform, chloromethiuron, chloropropylate, chlorpyrifos, chlorthiophos, clofentezine, closantel, coumaphos, crotamiton, crotoxyphos, cyanthoate, cycloprate, cyenopyrafren, cyflumetofen, cyhalothrin, cyhexatin, cypermethrin, cyromazine, DDT, demeton, demeton-methyl, demeton-O, demeton-O-methyl, demeton-S, demeton-S-methyl, diafenthiuron, dialifos, diazinon, dichlofluanid, dichlorvos, dicofol, dieldrin, dienochlor, diflovidazin, dimefox, dimethoate, dinex, dinobuton, dinocap, dinocton, dinopenton, dinosulfon, dinoterbon, dioxathion, diphenyl sulfone, disulfoton, DNOC, endosulfan, endothion, ethion, ethoate-methyl, etoxazole, fenazaflor, fenazaquin, fenbutatin oxide, fenothiocarb, fenpropathrin, fenpyroximate, fenson, fentrifanil, fenvalerate, fipronil, fluacrypyrim, fluazuron, flubenzimine, flucycloxuron, flucythrinate, fluenetil, flufenoxuron, flumethrin, fluorbenside, fluvalinate, formetanate, formothion, formparanate, genit, halfenprox, heptenophos, hexachlorophene, hexythiazox, isocarbophos, lindane, malathion, mecarbam, methacrifos, methamidophos, methiocarb, metolcarb, mevinphos, milbemectin, mipafox, monocrotophos, naled, nifluridide, omethoate, oxamyl, oxydeprofos, oxydisulfoton, parathion, permethrin, phenkapton, phorate, phosalone, phosmet, phoxim, pirimiphos-methyl, propargite, propetamphos, propoxur, prothidathion, prothoate, pyridaben, pyrimidifen, quinalphos, quintiofos, schradan, sophamide, spirodiclofen, sulfluramid, sulfotep, sulfur, tau-fluvalinate, tebufenpyrad, TEPP, tetrachlorvinphos, tetradifon, tetrasul, thiocarboxime, thiofanox, thiometon, thioquinox, thuringiensin, triarathene, triazophos, trichlorfon and vamidothion.

The pest may be in any part of its life cycle, for example, an egg, larvae, pupa, adult or nymph. In some embodiments, the pest may be in larval form.

In particular embodiments, the pest is a tick or a mite, especially a tick or a mite in larval form, especially a cattle tick in larval form.

In some embodiments, the method of the invention is a method of treating or preventing a pest infestation in a livestock animal or a companion animal, wherein the pest infestation is caused by a population of pests comprising pesticide resistant pests. The method involves applying a compound of formula (I) as defined above to the livestock animal or companion animal.

In some embodiments, the livestock animal is selected from cattle, sheep, goats, deer, pigs, camels, llamas, alpacas, chickens and the like. In other embodiments, the companion animal is selected from a dog, cat, rabbit, guinea pig, hamster, mouse, horse, and the like.

In some embodiments, the compound of formula (I) is applied topically, for example by dipping, spraying, pour-on, washing, fogging or misting, drenching or droplet application. In other embodiments the compound of formula (I) is applied systemically, for example, in a tablet, capsule, chewable tablet or liquid drench formulation.

In some embodiments, the method is for controlling a pest infestation or potential pest infestation in an environment, wherein the pest infestation is caused by a population of pests comprising pesticide resistant pests. The method involves applying a compound of formula (I) as defined above to the environment hosting the pest infestation or at risk of hosting a pest infestation. The environment may be any environment that may host a pest infestation, for example, an agricultural environment, a household environment, an industrial environment or a leisure environment. In particular embodiments, the environment is an agricultural environment.

In some embodiments, the method is used to control pests that infest stored plant products. The method involving contacting the plant product with a compound of formula (I).

Suitably, the plant part that is to be protected is contacted by dipping, spraying, fogging or misting. The contact may be achieved prior to or during storage, especially prior to storage.

In some embodiments, the plant part is grain that is to be stored before use, for example, in a silo. This method may be particularly useful for controlling pests that damage grain in storages, where the population of pests comprises pesticide resistant pests, for example, populations of *Rhyzopertha dominica, Sitophilus oryzae, Tribolium castaneum, Oryzaephilus surinamensis* or *Cryptolestes ferrugineous* including pests resistant to organophosphates such a fenitrothion, malathion, chlorpyrifos-methyl and pirimiphos-methyl; and/or synthetic pyrethroids such as deltamethrin or bioresmethrin; and/or insect growth regulators such a methoprene.

In some embodiments, the method is used to control pests that infest crops and cause damage, especially grain crops, such as rice, wheat, durum wheat, corn, maize, barley, millet, sorghum, oats, rye, triticale, teff, fonio, wild rice and spelt. The method involves contacting the pest with a compound of formula (I) in an agricultural environment. The contact may be made by applying the compound or a composition comprising a compound of formula (I) to a crop and/or the soil surrounding the crop, where the crop is infested with the pest or is likely to become infested with the pest, particularly a population of pests that includes pesticide resistant pests. Examples of pesticide resistant pests include populations of *H. destructor* (Redlegged earth mite), *Balustium medicagoense, Penthaleus* spp such as Blue oat mite and *Bryobia* spp such as clover mite that are resistant to organophosphates such as chlorpyrifos and/or pyrethroids such as bifenthrin.

While in some embodiments, the compound of formula (I) may be applied neat, in particular embodiments, the compound of formula (I) is applied in the form of a composition together with acceptable carriers, diluents and/or excipients. This also applies to exposure of the pests to the compound of formula (I).

The composition may be formulated into any suitable composition such as a spray, aerosol, oil, emulsifiable concentrate, wettable powder, flowable formulation, granulated formulation, powder, dust, solution, suspension, emulsion or controlled release formulation, tablet, capsule, oral liquid formulation, shampoo, conditioner, spot-on formulation, drench or dip. The composition may be formulated with solid or liquid carriers as appropriate. The choice of formulation and mode of application will depend on the pest being controlled, the environment it is being controlled in or the animal which is troubled by the pest, and appropriate selection will be made with consideration of pest, subject and environment.

In some embodiments, the formulation may contain naturally occurring additive, such as antioxidants and stabilizers. For example, antioxidants may include α-tocopherol, and suitable stabilizers may include gum arabic, guar gum, locust bean gum, xanthan gum, kelgum, polyvinyl alcohol, sodium caseinate and mixtures thereof.

Examples of solid carriers useful in preparing the formulations are clays including kaolin clay, diatomite, water-containing synthetic silicon oxide, bentonite, Fubasami clay, and acid clay; talcs; ceramics; inorganic minerals such as Celite™, quartz, sulfur, active carbon, calcium carbonate and hydrated silica; these solid carriers being finely divided or granular. Examples of useful liquid carriers are water, alcohols such as methanol and ethanol, ketones such as acetone and methyl ethyl ketone, aromatic hydrocarbons such as benzene, toluene, xylene, ethylbenzene and methylnaphthalene, aliphatic hydrocarbons such as hexane, cyclohexane, kerosene and light oil, esters such as ethyl acetate and butyl acetate, nitriles such as acetonitrile and isobutyronitrile, ethers such as diisopropyl ether and dioxane, acid amides such as N,N-dimethylformamide and N,N-dimethylacetamide, halogenated hydrocarbons such as dichloromethane, trichloroethane and carbon tetrachloride, dimethyl sulfoxide, and fish oils, mineral oils, plant derived oils such as olive oil, canola oil, cotton-seed oil, soybean oil and sesame oil as well as essential oils such as lavender oil, eucalyptus oil, tea tree oil, citrus oil etc. Solid or liquid carriers can be used alone or in combination. Examples of gas carriers, those of propellants, are butane gas, isobutene, pentane, LPG (liquefied petroleum gas), dimethyl ether, fluorocarbons and carbon dioxide gas.

Examples of surfactants are alkylsulfuric acid esters, alkylsulfonic acid salts, alkylarylsulfonic acid salts, alkyl aryl ethers and polyoxyethylene adducts thereof, polyethylene glycol ethers, polyhydric alcohol esters, sugar alcohol derivatives, sorbitane monolaurate, alkylallyl sorbitane monolaurate, alkylbenzene sulfonate, alkylnaphthalene sulfonate, lignin sulfonate, and sulfuric acid ester salts of higher alcohols. These surfactants may be used alone or in combination.

Examples of adjuvants for the formulations, such as binders and dispersants, are casein, gelatin, polysaccharides such as starch, gum arabic, cellulose derivatives and alginic acid, lignin derivatives, bentonite, sugars and water-soluble synthetic high molecular-weight substances such as polyvinyl alcohol, polyvinyl pyrrolidone and polyacrylic acids. Examples of stabilisers are PAP (acid isopropyl phosphate), BHT (2,6-di-tert-butyl-4-methylphenol), BHA (mixture of 2-tert-butyl-4-methoxyphenol and 3-tert-butyl-4-methoxyphenol), synergists such as piperonyl butoxide, vegetable oils, mineral oils, fish oils, surfactants and fatty acids or esters thereof.

Emulsifying agents that may be used are suitably one or more of those selected from non-ionic or anionic emulsifying agents. Examples of non-ionic emulsifying agents include, but are not restricted to, polyoxyethylenealkylphenylether, polyoxyethylenealkylether, polyethyleneglycol fatty ester, sorbitan fatty ester, polyoxyethylene sorbitan fatty ester, polyoxyethylenesorbitol fatty ester, polyoxyethylenepolyoxypropylenealkylether. Examples of anionic emulsifying agents include alkyl sulphates, polyoxyethylenealkylether sulphates, sulfosuccinates, taurine derivatives, sarcosine derivatives, phosphoric esters, alkylbenzenesulfonates and the like. A mixture consisting of polyoxyethylenestyrylphenylether and calcium allylbenzenesulfonate is preferred. These emulsifying agents may be used in an amount of 1 to 20 weight parts per 100 weight parts of the compositions of the present invention.

In some embodiments, the compound of formula (I) is formulated as a spray. The spray may be formulated as a liquid for use in an atomizer or aerosol. In some embodiments, the liquid solubilizes the compound of formula (I), for example, where the liquid or solvent is an oil or hydrocarbon solvent. In other embodiments, the liquid is an aqueous liquid and the formulation is in suspension or emulsion form.

In some embodiments, the composition may include a propellant such as butane, isobutene, pentane, carbon dioxide or nitrogen.

In some embodiments, the spray may be deployed topically in an environment or on an animal, or may be applied directly to the resistant pests. In other embodiments, the compound of formula (I) may be formulated in a viscous formulation that is soaked into a carrier, such as a filter paper or fabric and left at the site of a pest infestation for contact with the pest. In some embodiments, the compound of formula (I) may be formulated in a slow release formulation.

The methods of the invention may be deployed as part of an integrated pest management system where the compound of formula (I) is used in combination with other pesticides, either simultaneously or sequentially. The compounds of formula (I) are potassium channel activators. In some embodiments, the compound of formula (I) is in combination with another pesticide which has a different mode of action. In particular embodiments, the pesticide resistant pest is not resistant to the effects of either of the compounds used in combination. In some embodiments, the combination of compound of formula (I) and second pesticide is in a single composition. In other embodiments, the compound of formula (I) and second pesticide are in separate compositions. The second pesticide may be chosen from the insecticides or the arachnidcides or acaricides listed above.

In order that the invention may be readily understood and put into practical effect, particular preferred embodiments will now be described by way of the following non-limiting examples.

EXAMPLES

Example 1: Larval Packet Test—Cattle Tick

Figure 1:
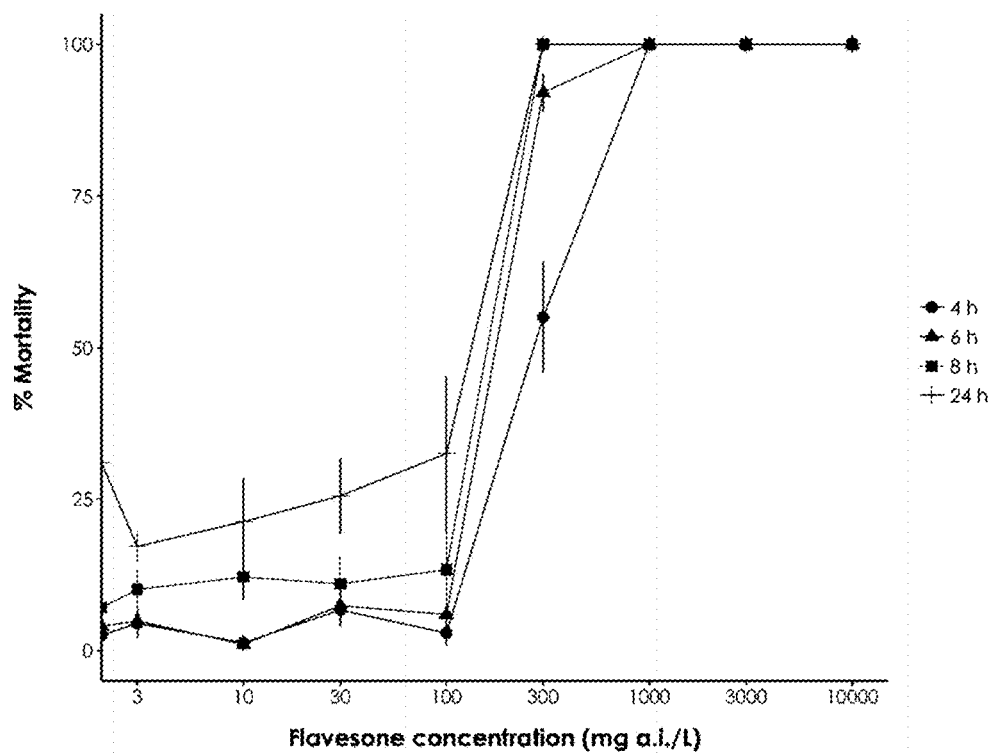
FIG. 1 is a graphical representation of dose-response curves of a susceptible population of H. destructor when exposed to flavesone at concentrations of 0, 3, 10, 30, 100, 300, 1000, 3000 and 10000 mg a.i./L (ppm) at 4, 6, 8 and 24 hours.

The larval packet test (LPT) is a modification of that first described by Stone and Haydock (1962, Bull. Entomol. Res., 563-578, http://dx.doi.org/10.1017/5000748530004832X) for evaluation of field resistance in cattle tick (*Rhipicephalus microplus*) larvae.

The first LPT assay was conducted to identify the potential range of flavesone acaricidal activity against larvae of a susceptible non-resistant field strain (NRFS) of *R. microplus* as a reference strain using a wide range of concentrations (1 in 10 in series).

The test compound, flavesone, 6-isobutyryl-2,2,4,4-tetramethylcyclohexane-1,3,5-trione, 96.7%, was used. As its volatility/evaporative properties were unknown, the LPT method was modified to incorporate the use of suitably-sized polyethylene plastic sheets to envelop the larval packets, minimizing exposure of the test active to the atmosphere.

In addition, the use of the solvent trichloroethylene (TCE) was removed to avoid the time required for evaporation in the preparation of test papers. The test solutions were prepared in olive oil only at the diluent and the papers immediately enveloped in the plastic sheets and sealed with bulldog clips to minimize evaporation.

A stock solution with a concentration of 100,000 ppm (10%) flavesone was prepared in olive oil as the diluent (1.035 mL flavesone (96.7%) to 8.965 mL olive oil) and then further diluted 1 in 10 in series to also give 10,000 ppm, 1,000 ppm, 100 ppm, 10 ppm and 1 ppm concentration. The negative control was olive oil only. No positive control was included in this experiment. Due to the viscosity of the olive oil, all solutions were prepared using reverse pipetting technique.

Filter papers (75 mm×85 mm Whatman® No. 541), with grid patterns, were impregnated on ½ of the paper with 225 µL of each solution using a micro-pipette and immediately folded in half, enveloped in polyethylene plastic and sealed with 3 bulldog clips. The impregnated papers were kept at room temperature on aluminium trays for a minimum of 60 minutes to allow for dispersal across the grid pattern of the paper prior to aliquoting of larvae. The packets were prepared in duplicate for each concentration, including the negative control.

An 8 dram vial containing approximately 20,000 hatched 7-21 day old NRFS larvae (about 1 g eggs) was opened and set up on a moated tray with a small amount of detergenated water, about 15 to 30 minute before use. Only larvae that migrated to the top of the vial were used in the assay.

Aliquots of approximately 100 larvae were placed into each packet using plastic disposable forceps and the packets resealed and incubated and 27° C. and 85% relative humidity (RH).

After 24 hours, the larval packets were opened and the numbers of dead and live larvae were counted under a magnification lamp. Percentage mortality was calculated and, where applicable, corrected using Abbott's Formula (Abbott, 1925, J. Economic Entomology, 18:256-257):

$$\frac{(\text{Treated \% mortality}) - (\text{control \% mortality})}{100 - (\text{control \% mortality})} \times 100$$

$LC_{50}$ and $LC_{99}$ values were determined by Probit mortality vs log concentration analysis. Probit values were derived from "Transformation of Percentages to Probit's Tables" published by Fisher R. A. and Yates F. (1938).

The results are shown in Tables 1 and 2.

TABLE 1

| | mortality |
|---|---|
| Concentration ppm | NRFS (%) |
| 100,000 | 100 |
| 10,000 | 100 |
| 1,000 | 96.97 |
| 100 | 1.82 |
| 10 | 0.62 |
| 1 | 0.0 |

$LC_{50}$ and $LC_{99}$ values were determined and are shown in Table 2.

TABLE 2

| Strain | $LC_{50}$ (ppm) | $LC_{99}$ (ppm) |
|---|---|---|
| NRFS | 171 | 3346 |

Example 2: LPT Assay With Resistant Larvae

The LPT Assay of Example 1 was repeated using a narrow range of concentrations, 1 in 2 series, of flavesone to determine $LC_{50}$ and $LC_{99}$ values against the susceptible NRFS and the multi-resistant Tiaro reference strain.

The Tiaro strain of *R. microplus* comprises of about 30% fluazuron, 60.6% cypermethrin (SP), 57.6% flumethrin (SP), 16.2% amitraz (amidine), 11.3% DDT, 9.3% chlorpyrifos (OP) and 2.4% dieldrin resistance [2014 acaricide resistance profiling].

The synthetic pyrethroid (SP) cypermethrin was included in the assay as a positive control.

The stock solution of flavesone (100,000 ppm) was diluted 1 in 10 with olive oil (1 mL to 9 mL diluent) to give 10,000 ppm, which was then further diluted 1 in 2 in series (5 mL to 5 mL diluent) to give 5,000 ppm, 2,500 ppm, 1,250 ppm, 625 ppm, 312.5 ppm and 156.25 ppm concentrations.

For the preparation of the positive control, cypermethrin, a stock solution of a concentration of 10,000 ppm was prepared in 2:1 trichloroethylene (TCE)/olive oil as the solvent (0.0352 g cypermethrin, 94.8% purity, to 10 mL solvent) and then further diluted 1 in 2 in series (5 mL to 5 mL solvent) to also give 5,000 ppm, 2,500 ppm, 1,250 ppm, 625 ppm, 312.5 ppm and 156.25 ppm.

The flavesone papers were prepared as in Example 1.

The cypermethrin papers were impregnated with 670 µL of each solution using a micro-pipette and hung on a rack in a fume-hood to allow papers to dry (evaporation of TCE) for a minimum of 60 minutes. The papers were then folded in half and sealed with three bulldog clips, placed on aluminium trays prior to aliquoting the larvae. All packets were prepared in duplicate.

The negative control papers were prepared for both flavesone (olive oil only) and the positive control, cypermethrin (2:1 TCE/olive oil).

Mortality was assessed at 24 hours and $LC_{50}$ and $LC_{99}$ values determined by Probit mortality vs log concentration analysis. A dose-response relationship was determined at 24 hours contact exposure. The results are shown in Table 3.

TABLE 3

| Flavesone | | | Cypermethrin | | |
|---|---|---|---|---|---|
| Conc (ppm) | NRFS | Tiaro | Conc (ppm) | NRFS | Tiaro |
| 10,000 | 100 | 100 | 10,000 | 100 | 66.84 |
| 5,000 | 100 | 100 | 5,000 | 100 | 62.22 |
| 2.500 | 100 | 100 | 2.500 | 100 | 59.72 |
| 1,250 | 100 | 100 | 1,250 | 100 | 20.90 |
| 625 | 11.76 | 12.83 | 625 | 99.56 | 21.92 |
| 312.5 | 0 | 0.13 | 312.5 | 89.01 | 20.36 |
| 156.25 | 0 | 0 | 156.25 | 67.33 | 0.56 |

At 1,250 ppm flavesone for both strains, some larvae were still waving their legs in the air; however, did not take a step to indicate survival (flaccid paralysis). At 2,500 ppm flavesone for both strains, no movement was noted with 100% mortality observed.

There was no evidence of cross-resistance to flavesone when comparing $LC_{50}$ and $LC_{99}$ data between the NRFS and Tiaro strains.

Negative control mortality ranged from 0% to 0.51% and where applicable was corrected using Abbott's formula.

$LC_{50}$ and $LC_{99}$ values were determined using Probit mortality vs log concentration analysis and are shown in Table 4.

TABLE 4

| Flavesone | | | Cypermethrin | | |
|---|---|---|---|---|---|
| Strain | $LC_{50}$ (ppm) | $LC_{99}$ (ppm) | Strain | $LC_{50}$ (ppm) | $LC_{99}$ (ppm) |
| NRFS | 690 | 1109 | NRFS | 128 | 540 |
| Tiaro | 647 | 1039 | Tiaro | 3082 | >10,000 |

Example 3

The experiment of Example 2 was repeated only on the NRFS strain with dilutions of 1 to 2 in series and cypermethrin as a positive control. The concentrations of flavesone were 5,000 ppm, 2,500 ppm, 1,250 ppm, 625 ppm and 312.5 ppm. The concentrations of cypermethrin were 1,250 ppm, 652 ppm, 312.5 ppm, 156.25 ppm, 78.125 ppm and 36.0625 ppm.

Mortality was assessed at 24 hours and $LC_{50}$ and $LC_{99}$ values determined by probit mortality vs log concentration analysis.

As with Example 2 at 1,250 ppm flavesone, some larvae were still waving their legs in the air; however did not take a step to indicate survival (flaccid paralysis). At 2,500 ppm flavesone, no movement was noted with 100% mortality observed.

Negative control mortality ranged between 0%-1.02% and where applicable was corrected using Abbott's formula.

The results are shown in Table 5:

TABLE 5

| Flavesone | | Cypermethrin | |
|---|---|---|---|
| Conc (ppm) | NRFS | Conc (ppm) | NRFS |
| 5,000 | 100 | 1250 | 100 |
| 2.500 | 100 | 625 | 100 |
| 1,250 | 100 | 312.5 | 99.16 |
| 625 | 11.76 | 156.25 | 79.56 |
| 312.5 | 1.28 | 78.125 | 20.57 |
| | | 39.0625 | 0 |

The $LC_{50}$ and $LC_{99}$ values are shown in Table 6:

TABLE 6

| Flavesone | | | Cypermethrin | | |
|---|---|---|---|---|---|
| Strain | $LC_{50}$ (ppm) | $LC_{99}$ (ppm) | Strain | $LC_{50}$ (ppm) | $LC_{99}$ (ppm) |
| NRFS | 610 | 1050 | NRFS | 112 | 317 |

Example 4

It was noted in Example 2 and Example 3 that although 100% mortality was recorded at 1,250 ppm flavesone concentration after 24 hours contact exposure, some larvae at this concentration, for both the NRFS and Tiaro strains, were still waving the legs in the air but unable to take a step to indicate survival (flaccid paralysis), therefore moribund. This experiment was conducted to confirm whether to not these larvae died within a further 24 hours contact exposure, with mortality assessed at 48 hours.

Concentrations of 1,250 ppm, 625 ppm and 312.5 ppm flavesone concentrations prepared for Example 3 were used on the same day of preparation. Duplicate papers were prepared for both the NRFS and Tiaro strains (including negative controls) as described in Example 2.

Mortality was assessed at 48 hours and $LC_{50}$ and $LC_{99}$ values were determined by Probit mortality vs log concentration analysis. The results are shown in Tables 7 and 8.

Negative control mortality ranged between 0.79% and 3.91% and corrections were made by using Abbott's formula.

TABLE 7

Flavesone

| Conc (ppm) | NRFS | Tiaro |
|---|---|---|
| 1250 | 100 | 100 |
| 625 | 66.83 | 84.13 |
| 312.5 | 2.17 | 0.97 |

TABLE 8

Flavesone

| Strain | $LC_{50}$ (ppm) | $LC_{99}$ (ppm) |
|---|---|---|
| NRFS | 526 | 923 |
| Tiaro | 521 | 887 |

Example 5: Evaluation of Flavesone as a Grain Protectant

A laboratory established insect population of *Rhyzopertha dominica* (QRD1440) with a history of resistance to organophosphates and pyrethroids were used in this study.

Residue free organically produced wheat grain was used in the study. The moisture content of the wheat was kept at 11%.

Test solutions of flavesone (25 ppm), deltamethrin (K-Obiol®, 1 ppm) and chlorpyrifos (Reldan®, 5 ppm and 10 ppm) in water were prepared. Water was used as the control sample. Five lots of 240 g of wheat was weighed into glass 1 L capacity jars, one jar per treatment and control.

The test solutions and control solutions were pipetted onto the inside of one of the jars (one jar per sample) immediately above the grain surface at a rate equivalent to 10 mL of solution per kg of wheat. The jars were sealed, briefly shaken and tumbled by hand, then tumbled mechanically for 10 minutes. The moisture content was 12%, reflecting the upper limit accepted by Australian bulk handling companies. The day after treatment, each 240 g wheat sample was divided into three replicates of 80 g and placed into glass jars 250 mL capacity.

50 adult *R. dominica* QRD1440 (1 to 3 weeks post-emergence) were added to each jar of treated or control wheat. Each jar was covered with filter paper as a lid and stored at 25° C. and 55% R.H. for 14 days, after which the wheat sample was sieved to retrieve the adult insects. Mortality was recorded. All adults, dead and alive, were discarded. The jars of wheat were incubated for a further 6 weeks and the number of progeny recorded. The results are shown in Table 9:

TABLE 9

14 day mortality of QRD1440 *R. dominica*

| Treatment (ppm) and Replicate | | 14 Day adult mortality No. dead (total) | F1 Progeny Count No. dead/total |
|---|---|---|---|
| Control | A | 0/50 | 1/204 |
| | B | 0/50 | 0/133 |
| | C | 0/50 | 0/151 |
| Flavesone (25 ppm) | A | 19/50 | 0/37 |
| | B | 11/50 | 0/62 |
| | C | 14/50 | 0/90 |

TABLE 9-continued 14 day mortality of QRD1440 *R. dominica*

| Treatment (ppm) and Replicate | | 14 Day adult mortality No. dead (total) | F1 Progeny Count No. dead/total |
|---|---|---|---|
| Deltamethrin (1 ppm) | A | 1/50 | 0/142 |
| | B | 0/50 | 0/79 |
| | C | 1/50 | 2/292 |
| Chlorpyrifos (5 ppm) | A | 0/50 | 2/470 |
| | B | 1/50 | 3/172 |
| | C | 0/50 | 3/355 |
| Chlorpyrifos (10 ppm) | A | 0/50 | 1/350 |
| | B | 0/50 | 0/317 |
| | C | 0/50 | 2/232 |

At 25 ppm of flavesone the QDR1140 *R. dominica* resistant strain had higher mortality than the control and other pesticides used. The flavesone treatment also resulted in less F1 progeny being produced.

Example 6: Concentrations of Flavesone

The experiment of Example 5 was repeated with flavesone at concentrations of 25 ppm, 50 ppm and 75 ppm. Water was the control.

The results are shown in Table 10:

TABLE 10

14 day mortality QRD1440 *R. dominica* at different flavesone concentrations

| Treatment (ppm) and Replicate | | 14 day Adult Mortality No. dead/ total | F1 Progeny count No. dead/total |
|---|---|---|---|
| Control | A | 0/50 | 5/515 |
| | B | 1/50 | 2/471 |
| | C | 1/50 | 3/341 |
| Flavesone (25 ppm) | A | 22/50 | 0/20 |
| | B | 21/50 | 0/5 |
| | C | 30/50 | 0/20 |
| Flavesone (50 ppm) | A | 47/50 | 0/0 |
| | B | 49/50 | 0/0 |
| | C | 47/50 | 0/0 |
| Flavesone (75 ppm) | A | 50/50 | 0/0 |
| | B | 50/50 | 0/0 |
| | C | 50/50 | 0/0 |

Example 7: Control of Resistant Strain of Lesser Grain Borer QRD1440 *R. dominica*

The experiment of Example 5 was repeated with flavesone at a concentration of 60 ppm. Water was used as the control.

The results are shown in Table 11.

TABLE 11

Response of resistant strain of lesser grain borer (*R. dominica*, QRD1440) to flavesone at a rate of 60 ppm

| Treatment (ppm) and Replicate | | 14 day Adult Mortality No. dead/ total | F1 Progeny count No. dead/total |
|---|---|---|---|
| Control | A | 0/50 | 2/589 |
| | B | 0/50 | 2/204 |
| | C | 0/50 | 2/575 |

TABLE 11-continued

Response of resistant strain of lesser grain borer (*R. dominica*, QRD1440) to flavesone at a rate of 60 ppm

| Treatment (ppm) and Replicate | | 14 day Adult Mortality No. dead/total | F1 Progeny count No. dead/total |
|---|---|---|---|
| Flavesone (60 ppm) | A | 50/50 | 0/0 |
| | B | 50/50 | 0/0 |
| | C | 50/50 | 0/0 |

Example 8: Comparative Studies With a Susceptible Strain of Lesser Grain Borer QRD14 *R. dominica*

The experiment of Example 5 was repeated using a laboratory reared susceptible strain QQRD14 of *R. dominica* and different concentrations of flavesone to determine efficacy.

The results are shown in Table 12.

TABLE 12

Response of susceptible strain of lesser grain borer (*R. dominica*, QQRD14) to flavesone at a broad application range.

| Treatment (ppm) and Replicate | | 14 day Adult Mortality No. dead/total | F1 Progeny count No. dead/total |
|---|---|---|---|
| Control | A | 2/50 | 4/499 |
| | B | 0/50 | 9/604 |
| | C | 0/50 | 3/801 |
| Flavesone (5 ppm) | A | 0/50 | 4/930 |
| | B | 0/50 | 4/999 |
| | C | 0/50 | 1/866 |
| Flavesone (10 ppm) | A | 6/50 | 3/446 |
| | B | 8/50 | 0/444 |
| | C | 6/50 | 3/487 |
| Flavesone (25 ppm) | A | 50/50 | 0/0 |
| | B | 50/50 | 0/0 |
| | C | 50/50 | 0/0 |
| Flavesone (50 ppm) | A | 50/50 | 0/0 |
| | B | 50/50 | 0/0 |
| | C | 50/50 | 0/0 |
| Flavesone (100 ppm) | A | 50/50 | 0/0 |
| | B | 50/50 | 0/0 |
| | C | 50/50 | 0/0 |

Example 9: Control of *Halotydeus destructor* (Redlegged Earth Mite)—Dose Response in Susceptible Populations The efficacy of flavesone against *H. destructor* was assessed using the glass vial technique developed by Hoffmann et al. (1997, Exp. Appl. Acarol., 21:151-162), adapted for plastic vials. A susceptible population of mites was collected from capeweed (*Arctotheca calendula*) at a Victorian site (37° 40'33"S, 145° 07' 45"E) that had no known history of insecticide application. Following collection, samples were stored in small plastic containers with leaf material and paper towel to absorb excess moisture. Containers were kept at 4° C. prior to testing.

Serial dilutions of each insecticide were prepared from the compositions shown in Table 13:

TABLE 13

| Insecticide | Active ingredient | Field rate | Concentration |
|---|---|---|---|
| Flavocide 500EW | Flavesone 500 g/L | 2000 mL/100 L | 10000 mg a.i./L |
| Talstar ® 250EC | Bifenthrin 250 g/L | 40 mL/100 L | 100 mg a.i./L |
| Lorsban ™ 500EC | Chlorpyrifos 500 g/L | 140 mL/100 L | 700 mg a.i./L |

The test compositions included 0.1% Tween 20 non-ionic surfactant to aid the spread of insecticides when coating plastic vials. This concentration of Tween 20 has been previously shown to have no toxic effect on *H. destructor*. For each insecticide concentration tested, 3, 10, 30, 100, 300, 1000, 3000 and 10000 mg a.i./L (ppm), approximately 10 mL of solution was poured into a 15 mL plastic vial and swirled to ensure a complete coating, with excess liquid removed. Eight vials were coated per concentration and were left to dry overnight. Control vials were treated in the same way but with water used in place of test composition.

Eight susceptible *H. destructor* mites were then placed into each vial along with a leaf of common vetch (*Vicia sativa*). The leaf was added to provide food and increase humidity. Vials were then sealed with a lid and placed at 18° C. After 4, 6, 8 and 24 hours of exposure, the mites were scored as alive (moving freely), incapacitated (inhibited movement), or dead (no movement over a 5 second period). Incapacitated individuals were pooled with dead individuals for analysis as they invariably died and therefore did not contribute to the next generation.

The results for flavesone are shown in FIG. 1. Mortality of *H. destructor* increased dramatically between 100 and 300 mg a.i./L and mortality increased with duration of exposure. At 4 hours of exposure, flavesone at 300 mg a.i./L had caused an average of 55% mortality, while at application rates below this, little mortality was observed. All application rates above 300 mg a.i./L resulted in 100% mortality by 4 hours exposure. By 8 hours of exposure, mortality at 300 mg a.i./L had risen to 100%. At lower application rates, increased mortality was observed at 24 hours.

Example 10: Control of *Halotydeus destructor* (Redlegged Earth Mite)—Dose Response in Susceptible and Resistant Populations The experiment set out in Example 9 was repeated with susceptible and resistant populations of *H. destructor*, with the exception that the mites were observed at 6 and 24 hours. The resistant population of *H. destructor* was collected from a lucerne paddock in the Upper South-East district of South Australia, where resistance to synthetic pyrethroids was confirmed in late 2016.

The data produced in the assays were assessed for concentrations that caused 50, 90 and 99% mortality (lethal concentration, LC), together with 95% confidence intervals (CIs) and were estimated from observations of mortality after 24 hours exposure using a binomial logistic regression (Robertson & Preisler, 1992, Pesticide Bioassays with Arthropods. CRC: Boca Raton; Venables & Ripley, 2002, Modern Applied Statistics with S. Springer: New York). Population differences were tested by comparing the change in model deviance with and without the population factor (different regression intercepts for each population). Differences in regression slopes between populations were tested by comparing the change in model deviance with and without the population×dose interaction term. The resistance ratio of the insecticide-resistant population was estimated as the ratio of its $LC_{50}$ to that of the susceptible population. All analyses were performed using R 3.3. (R Core Team 2017, R: A language and environment for statistical computing. R Foundation for Statistical Computing, Vienna, Austria. http://www.R-project.org).

Figure 2:
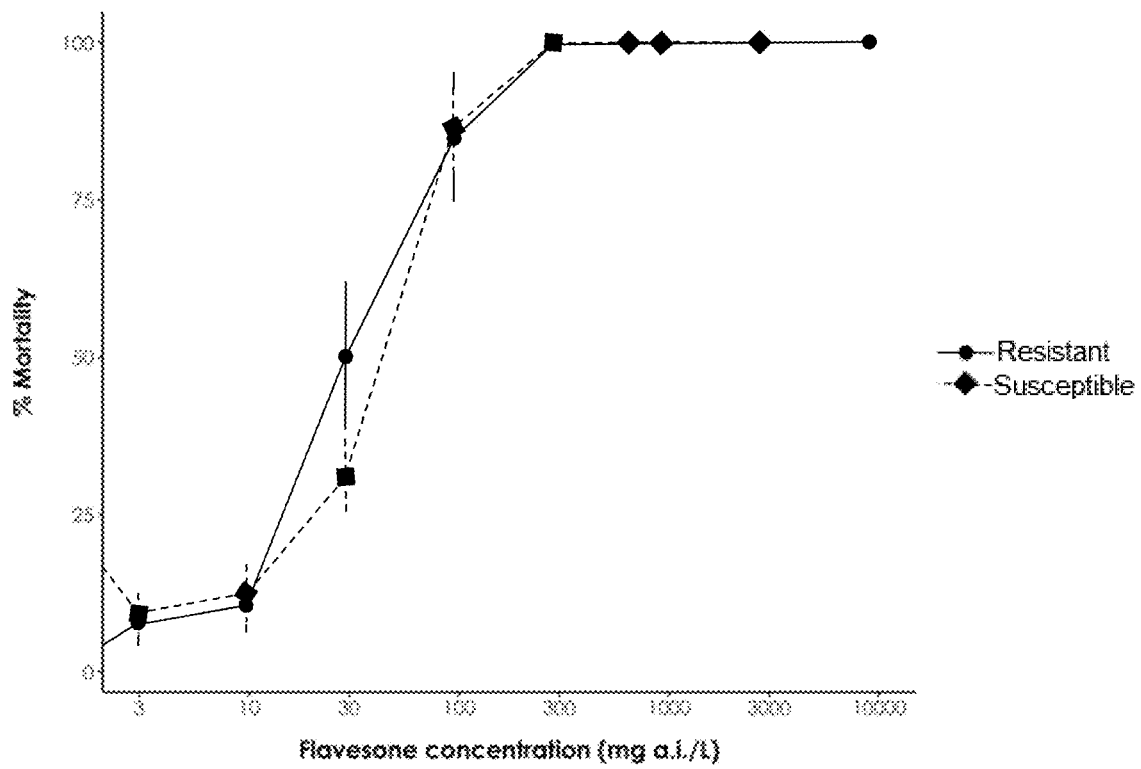
FIG. 2 is a graphical representation of dose-response curves of susceptible and resistant populations of H. destructor when exposed to flavesone at concentrations of 0, 3, 10, 30, 100, 300, 1000, 3000 and 10000 mg a.i./L (ppm) at 24 hours.

Dose response curves showing the effects of flavesone on susceptible and resistant *H. destructor* populations after 24 hours exposure are shown in FIG. 2. Flavesone was equally effective against both insecticide-resistant and susceptible populations as evidenced by closely aligning dose-response curves for both populations ($\chi^2=1.40$, df=1, p=0.24). $LC_{50}$ values (and 95% CIs) were calculated as 40.6 (33.3–49.6) mg a.i./L and 34.2 (27.9–41.9) mg a.i./L for the susceptible and resistant populations, respectively, for flavesone as shown in Table 14. There was no evidence that the regression slopes for concentration were significantly different between populations ($\chi^2=0.01$, df=1, p 0.91).

Figure 3:
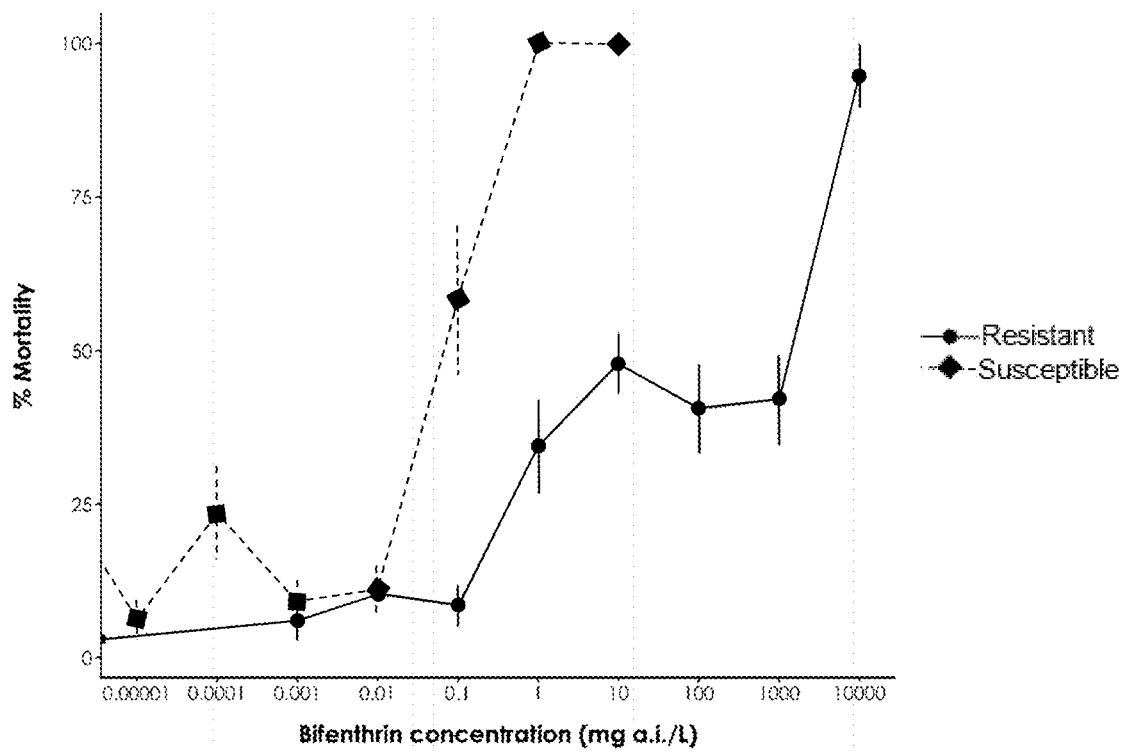
FIG. 3 is a graphical representation of dose-response curves of susceptible and resistant populations of H. destructor when exposed to bifenthrin at concentrations of 0, 0.00001, 0.0001, 0.001, 0.01, 0.1, 1.0, 10, 100, 1000 and 10000 mg a.i./L (ppm) at 24 hours.
Figure 4:
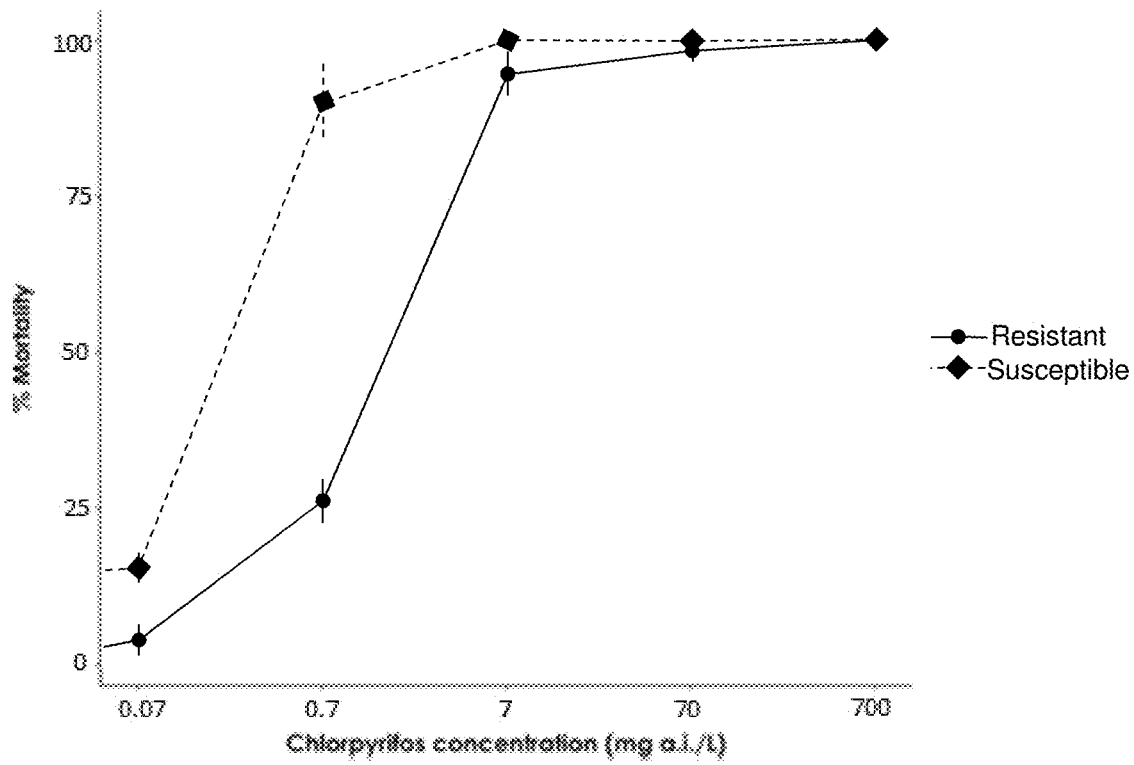
FIG. 4 is a graphical representation of dose-response curves of susceptible and resistant populations of *H. destructor* when exposed to chlorpyrifos at concentrations of 0, 0.7, 7.0, 70 and 700 mg a.i./L (ppm) at 24 hours.

A large difference was seen in sensitivity to bifenthrin between susceptible and resistant populations ($\chi^2=167.57$, df=1, p=0.0001) as shown in FIG. 3. Comparing the LC50 values between populations showed that the resistant population requires about 3,500 times the dose of bifenthrin compared to the susceptible population to achieve 50% mortality after 24 hours. This population likely included a mixture of resistant and susceptible individuals. The LC50 value for the susceptible population of 0.04 (0.03–0.08) mg a.i./L is consistent with previous studies using *H. destructor* collected from this location. The regression coefficients were also significantly different between populations ($\chi^2=28.76$, df=1, p=0.0001).

For chlorpyrifos, dose-responses were also significantly different between the insecticide-resistant and susceptible populations ($\chi^2=44.13$, df=1, p=, 0.0001). The resistant population was 6.5 times more resistant to chlorpyrifos than the susceptible population. This is comparable to the organophosphate resistance seen in South Australia. There is no evidence that the regression slopes for concentration were different between populations. ($\chi^2=1.77$, df=1, p=0.18).

$LD_{50}$, $LD_{90}$ and $LD_{99}$ values and confidence intervals for 24 hours exposure are shown in Table 14.

Example 11: Efficacy of Flavesone Against Susceptible and Resistant Populations of Green Peach Aphid Colonies of *M. persicae* (green peach aphid) were established from long-term laboratory cultures of a known insecticide-susceptible population, and a population which has previously been shown to be resistant to carbamates and synthetic pyrethroids. Each colony was maintained separately on bok choi plants (*Brassica napus chinensis*) within an exclusion cage in a constant temperature room at 24° C. with a photoperiod of 16:8 LD.

Laboratory bioassays were used to determine the efficacy of flavesone against *M. persicae* following the leaf dip method described in Moores et al. (1994, Pesticide Biochemistry and Physiology, 49, 114-120). A pilot study was first conducted which confirmed that the leaf dip method was appropriate to elicit a clear dose response for Flavocide 500EW against *M. persicae*, and to determine the appropriate rate range and timing of mortality assessments (scored at 24, 48, 72 & 96 hours) (data not shown).

Bioassays were then conducted to assess the efficacy of flavesone against a susceptible and resistant population of *M. persicae*, and to calculate LC values. The efficacy of a conventional insecticide, pirimicarb, was tested for comparison. Nine concentrations of flavesone ranging from $1\times10^{-3}$ to 10 times the proposed field rate (Table 15), and six concentrations of pirimicarb were serially diluted and tested, along with a water control, against the susceptible and resistant aphid populations. Leaf discs (25 mm diameter) cut from bok choi leaves were submerged for 1 second in the insecticide solutions, or in the water control, and placed adaxial side up on 10 g/L agar in 35 mm petri dishes. Six replicate leaf discs were prepared per treatment. Once leaves were air-dry, eight *M. persicae* nymphs were transferred to each insecticide-dipped leaf disc using a fine-haired paintbrush.

After aphid introduction, each petri dish was inverted onto a lid containing a 25 mm diameter filter paper to control humidity. All petri dishes were then placed into an incubator

TABLE 14

| Insecticide | Population | Regression slope coeffeicient (±SE) | LC quantile | LC (mg a.i./L) | Lower - upper 95% CIs (mg a.i./L) |
|---|---|---|---|---|---|
| Flavesone | Susceptible | 1.75 (0.17) | $LC_{50}$ | 40.6 | 33.25-49.58 |
| | | | $LC_{90}$ | 142.55 | 105.76-192.15 |
| | | | $LC_{99}$ | 561.35 | 335.01-940.61 |
| | Resistant | 1.78 (0.17) | $LC_{50}$ | 34.22 | 27.93-41.91 |
| | | | $LC_{90}$ | 117.89 | 86.60-160.47 |
| | | | $LC_{99}$ | 454.76 | 267.01-774.52 |
| Bifenthrin | Susceptible | 0.54 (0.05) | $LC_{50}$ | 0.04 | 0.03-0.08 |
| | | | $LC_{90}$ | 2.66 | 1.03-6.86 |
| | | | $LC_{99}$ | 233.10 | 44.58-1218.91 |
| | Resistant | 0.27 (0.05) | $LC_{50}$ | 143.79 | 59.03-350.21 |
| | | | $LC_{90}$ | $5.4 \times 10^5$ | $6.8 \times 10^5$-$4.2 \times 10^6$ |
| | | | $LC_{99}$ | $4.3 \times 10^9$ | $1.1 \times 10^8$-$1.7 \times 10^{12}$ |
| Chlorpyrifos | Susceptible | 1.68 (0.26) | $LC_{50}$ | 0.21 | 0.14-0.30 |
| | | | $LC_{90}$ | 0.76 | 0.44-1.33 |
| | | | $LC_{99}$ | 3.18 | 1.25-8.10 |
| | Resistant | 1.27 (0.18) | $LC_{50}$ | 1.37 | 0.93-2.01 |
| | | | $LC_{90}$ | 7.76 | 4.15-14.50 |
| | | | $LC_{99}$ | 51.56 | 17.49-152.04 |

These results show that flavesone is efficacious against *H. destructor* in both susceptible and insecticide-resistant populations and caused 50% mortality at 24 hours with a concentration between 34–40 mg a.i./L.

held at 18° C.±2° C. with a photoperiod of 16:8 LD cycle. At 48 & 96 hours, aphids were scored as alive (vibrant and moving freely), dead (not moving over a 5 second period), or incapacitated (inhibited movement). Incapacitated individuals were pooled with dead individuals for analysis as they invariably die and therefore do not contribute to the next generation.

TABLE 15

Chemical treatments used in this study.

| Insecticide | Active Ingredient | Field Rate | Concentration |
|---|---|---|---|
| Flavocide 500EW | Flavesone 500 g/L | 2000 mL/100 L* | 10,000 mg a.i./L |
| Pirimor 500WG | Pirimicarb 500 g/kg | 500 g/ha | 2,500 mg a.i./L |

*Suggested field rate of flavesone 500EW provided by the client (1% flavesone v/v).

Data Analysis

Dose-response curves were generated by plotting percentage mortality against log concentration. Mortality data was analysed using a logistic regression model with random effects. Logistic regression is suited for the analysis of binary response data (i.e. dead/alive) with the random effect component of the model controlling for the non-independence of mortality scores within replicates. Concentrations that resulted in 50, 90, and 99% mortality (lethal concentration, LC) (along with 95% confidence intervals, CIs) were calculated using a binomial logistic regression (Robertson & Preisler 1992, Pesticide Bioassays with Arthropods, CRC: Boca Ratan; Venables & Ripley 2002, Modern Applied Statistics with S, Springer, New York, http://www.stats.ox-.ac.uk/pub/MASS4). Population differences were tested by comparing the change in model deviance with and without the population factor (different regression intercepts for each population). Differences in regression slopes between populations were tested by comparing the change in model deviance with and without the population×dose interaction term.

Analyses were conducted using R version 3.3.1 (R Development Core Team 2017. R: A language and environment for statistical computing. R Foundation for Statistical Computing, Vienna, Austria, http://R-project.org).

Results

Figure 5:
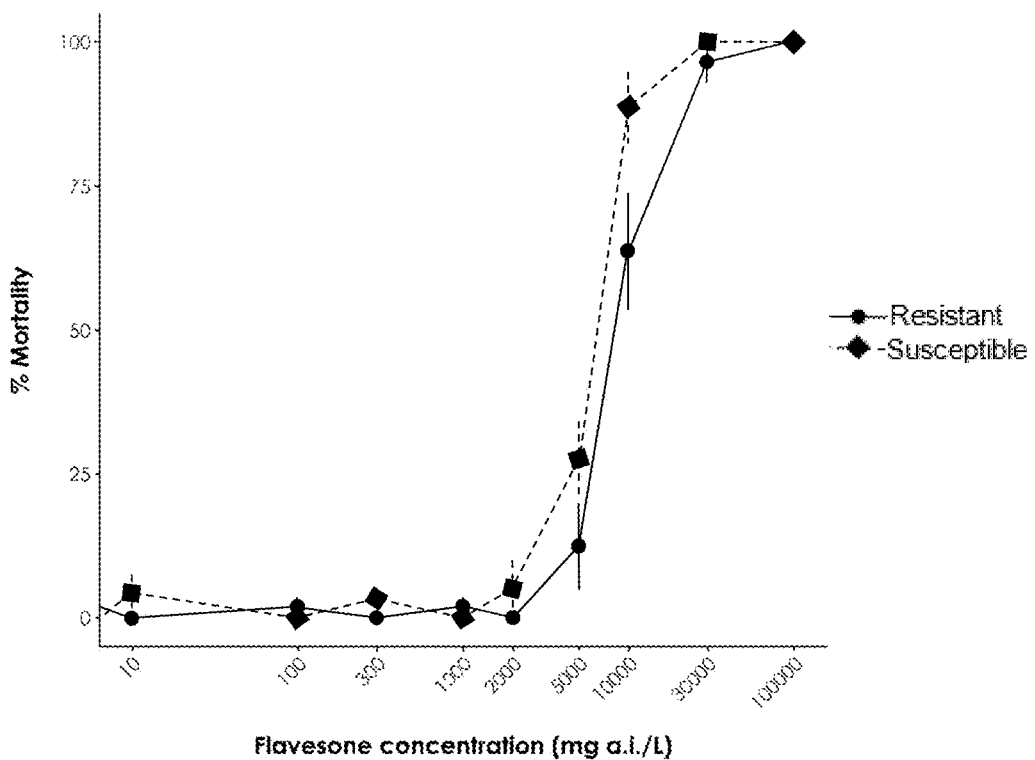
FIG. 5 is a graphical representation of dose-response curves of susceptible and resistant populations of green peach aphid exposed to flavesone at concentrations of 0, 10, 100, 300, 1000, 2000, 5000, 10000, 30000 and 100000 mg a.i./L and 48 hours exposure.
Figure 6:
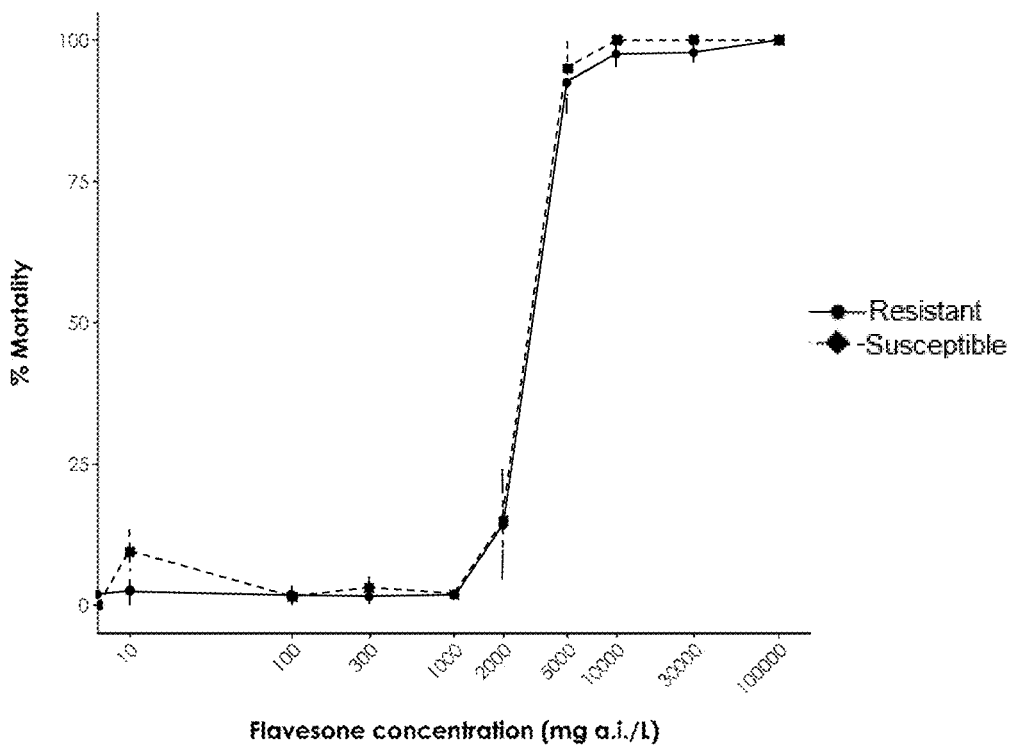
FIG. 6 is a graphical representation of dose-response curves of susceptible and resistant populations of green peach aphid exposed to flavesone at concentrations of 0, 10, 100, 300, 1000, 2000, 5000, 10000, 30000 and 100000 mg a.i./L and 96 hours exposure.

While the dose-response curves for the susceptible and resistant populations exposed to flavesone appeared similar at 48 hours (FIG. 5), a significant difference between populations was detected (c2=8.09, df=1, p<0.01). However, by 96 hours, the dose-response curves for the susceptible and resistant $M.$ $persicae$ populations exposed to flavesone had become more closely aligned and were not significantly different (c2=0.78, df=1, p=0.38) (FIG. 6). LC50 values (and 95% CIs) after 96 hours exposure were estimated as 2,731 (2,259-3,303) mg a.i./L for the susceptible population, and 3,151 (2,568-3,865) mg a.i./L for the resistant population (Table 16). The regression slopes between populations did not differ significantly at 48 hours (c2=0.49, df=1, p=0.48) or 96 hours (c2=0.72, df=1, p=0.40).

TABLE 16

LD50, LC90, and LC99 values (and 95% confidence intervals) and regression coefficients for $M.$ $persicae$, computed from logit models for responses to insecticides after 96 hours exposure.

| Active Ingredient | Population | Regression slope coefficients (±SE) | LC quantile | LC (mg a.i./L) | Lower - 95% CIs (mg a.i./L) |
|---|---|---|---|---|---|
| Flavesone | Susceptible | 2.77 | $LC_{50}$ | 2,731 | (2,259-3,303) |
| | | | $LC_{90}$ | 6,034 | (4,488-8,113) |
| | | | $LC_{99}$ | 14,330 | (8,826-23,267) |
| | Resistant | 2.38 | $LC_{50}$ | 3,151 | (2,568-3,865) |
| | | | $LC_{90}$ | 7,929 | (5,700-11,028) |
| | | | $LC_{99}$ | 21,708 | (12,551-37,544) |
| Pirimicarb | Susceptible | 1.52 | $LC_{50}$ | 18.5 | (13.4-25.6) |
| | | | $LC_{90}$ | 78.9 | (47.2-132) |
| | | | $LC_{99}$ | 384 | (154.9-952.2) |
| | Resistant | -0.13 | $LC_{50}$ | N/A | N/A |
| | | | $LC_{90}$ | N/A | N/A |
| | | | $LC_{99}$ | N/A | N/A |

Figure 7:
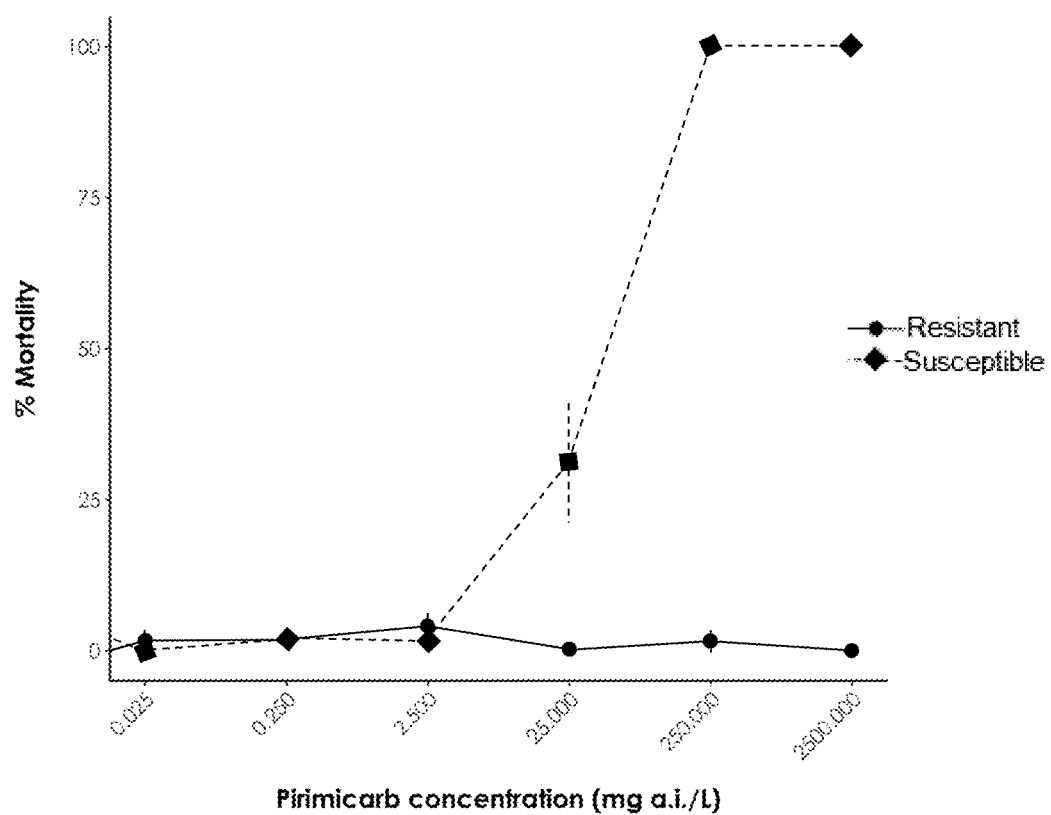
FIG. 7 is a graphical representation of dose-response curves of susceptible and resistant populations of green peach aphid exposed to pirimicarb at concentrations of 0.025, 0.25, 2.50, 25.0, 250.0 and 2500.0 mg a.i./L and 48 hours exposure.
Figure 8:
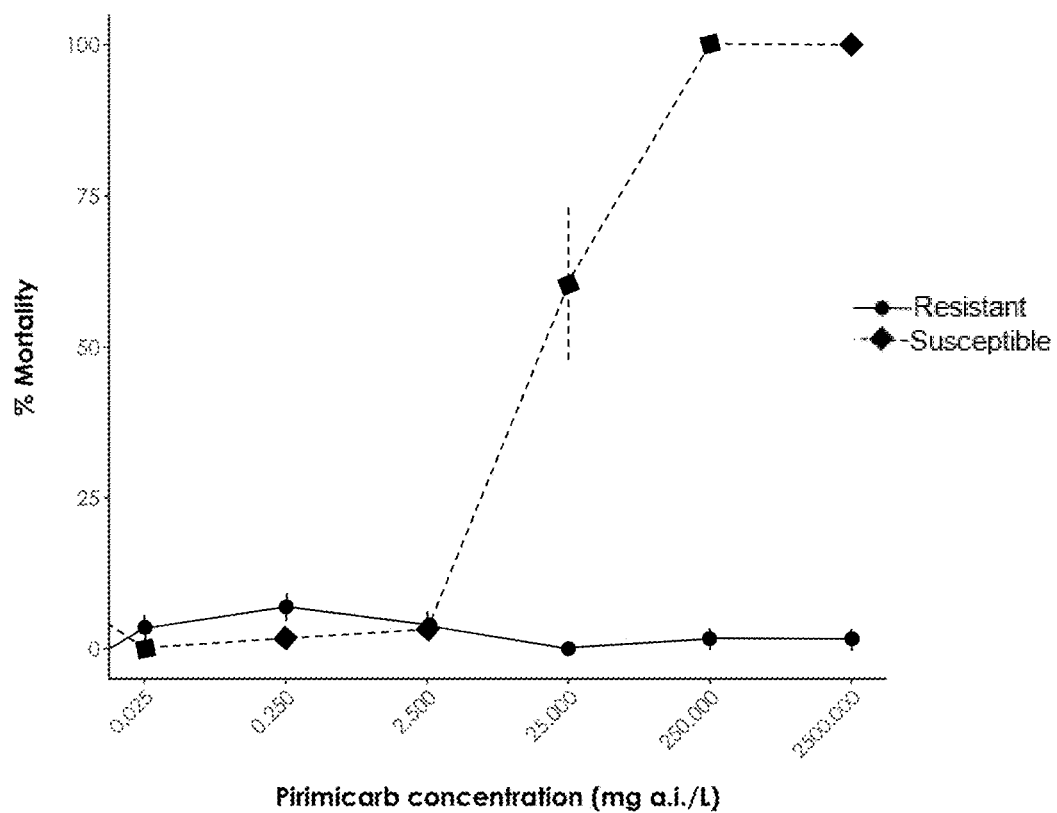
FIG. 8 is a graphical representation of dose-response curves of susceptible and resistant populations of green peach aphid exposed to pirimicarb at concentrations of 0.025, 0.25, 2.50, 25.0, 250.0 and 2500.0 mg a.i./L and 96 hours exposure.

At 48 and 96 hours, there were clear differences in the dose-response curves between the susceptible and resistant populations after exposure to pirimicarb (48 hr: c2=269.9, df=1, p<0.0001; 96 hr: c2=257.5, df=1, p<0.0001) (FIGS. 7 & 8). The regression slopes were also significantly different between populations (48 hr: c2=66.6, df=1, p<0.0001; 96 hr: c2=107.2, df=1, p<0.0001). The estimated LC50 for the susceptible population after 96 hours of 18.5 mg a.i./L is consistent with previous laboratory studies using $M.$ $persicae$ (Umina et al. 2014, Journal of Economic Entomology, 107(4), 1626 1638). Very low mortality observed for the resistant population when exposed to pirimicarb prevented the calculation of meaningful LC values (Table 16).

This study demonstrates that flavesone is efficacious against $M.$ $persicae$. The LC50 of flavesone after 96 hours exposure was between 2,731-3,151 mg a.i./L. The efficacy of pirimicarb was very high against the susceptible population and matched closely with previously published bioassay data. Resistance to pirimicarb in the insecticide-resistant population was confirmed. This population is also resistant to synthetic pyrethroids, as demonstrated by pesticide bioassay results and genetic screening (see Umina et al. 2014)

The dose-response curves for flavesone for the susceptible and resistant populations were closely aligned at 96 hours after exposure. This shows that flavesone is effective against $M.$ $persicae$ populations with resistance to carbamates, and that flavesone has a different mode of action to this class of insecticide. There was some evidence for population differences in responses after 48 hours. The reason(s) for this remains unclear but could reflect natural differences between the populations such as colony health, general hardiness, or bacterial endosymbionts.

Example 12: Toxicity of Flavesone to $Aedes$ $aegypti$ LVP (Insecticide Susceptible and PRS Insecticide Resistant Strains L3 Larvae Mosquito larval topical assay techniques were conducted. A dose response assay was used to determine the lethal concentration ($LC_{50}$) value, performed with a minimum 5-point dose of flavesone diluted in sterile $ddH_2O$, minimum of 4 technical replicates (5 mosquitos per replicate) per dose.

Two species of mosquito were used. $Aedes$ $aegypti$ (yellow fever mosquito) Liverpool strain (insecticide susceptible, LVP) and PRS Puerto Rican strain (synthetic pyrethroid resistant) at L3 stage larvae.

Negative control: vehicle
Positive control: technical grade synthetic pyrethroid (SP) and organophosphate (OP): deltamethrin (SP), permethrin (SP), and malathion (OP).
Phenotypic endpoint: scored for death/paralysis at 24, 48 and 72 hours.
Dose points (selected from pilot assays which are not shown):
Flavesone: 6.25 µg/mL, 25.0 µg/mL, 50 µg/mL, 75 µg/mL & 100 µg/mL; $H_2O$ control
Deltamethrin: 1.56 ng/mL, 6.25 ng/mL, 12.5 ng/mL, 25 ng/mL, 50 ng/mL; 0.625% DMSO negative control
Permethrin: 6.25 ng/mL, 12.5 ng/mL, 25 ng/mL, 50 ng/mL, 100 ng/mL; 0.625% DMSO negative control
Malathion: 0.0156 µg/mL, 0.0625 µg/mL, 0.125 g/mL, 0.25 µg/mL, 1 µg/mL; 0.5% EtOH negative control Larvae were transferred to a 24 well tissue plate using a wide-bore plastic transfer pipette, 5 larvae per well. The water was gently removed from the well with a 1 mL pipette and an equivalent amount of $ddH_2O$ was added. The appropriate volume of test compound was added to each of the four replicate wells per treatment and the plate gently swirled to ensure uniform mixing. The plate was placed in a test or growth chamber under constant conditions of 22-25° C. and about 75-85% relative humidity on a 12 h light/12 hr dark cycle. Assessment of dead and non-responsive larvae was undertaken at 24, 48 and 72 hours.

The results are shown in Table 17.

TABLE 17

| Time post exposure to chemistry | Test formulation Flavesone | Positive Control Deltamethrin (SP) | Positive Control Permethrin (SP) | Positive Control Malathion (OP) |
|---|---|---|---|---|
| Lethal Concentration (LC50) LVP Strain (insecticide susceptible) | | | | |
| 24 hours | 40.9 µg/mL | 11.9 ng/mL | 21.9 ng/mL | 110.3 ng/mL |
| 48 hours | 40.5 µg/mL | 4.9 ng/mL | 16.2 ng/mL | 38.9 ng/mL |
| 72 hours | 39.7 µg/mL | 3.7 ng/mL | 16.6 ng/mL | 29.75 ng/mL |
| Lethal Concentration (LC50) PRS Strain (insecticide resistant) | | | | |
| 24 hours | 40.9 µg/mL | 52.2 ng/mL (N = 2) | 164.2 ng/mL | 290.6 ng/mL |
| 48 hours | 40.5 µg/mL | 50.1 ng/mL (N = 2) | 150.5 ng/mL | 176.7 ng/mL |
| 72 hours | 39.7 µg/mL | 41.2 ng/mL (N = 2) | 128.0 ng/mL | 126.7 ng/mL |

Example 12: Evaluation of Flavesone as a Grain Protectant Against Major Stored Grain Pests Having Resistance to Commonly Used Pesticides Insects Laboratory established strains (both susceptible and resistant) of five species were considered for this stage of experiments. The resistant strains listed below represent the grain protectant-resistant genotypes that are commonly encountered in grain storages in Australia, particularly in the eastern grain belt:
R. dominica strain QRD1440 is resistant to OP protectants and pyrethroids.
T. castaneum strain QTC279 is resistant to malathion and bioresmethrin
C. ferrugineus strain QCF73 is resistant to phosphine
O. surinamensis strain QOS302 is resistant to fenitrothion & chlorpyrifos-methyl
S. oryzae strain QSO393 is resistant to fenitrothion Testing Program Grain Treatment and Bioassays Residue and insect-free organically produced wheat was used in this study. Moisture content of the wheat before treatment was kept at 11%. Chemicals for use in these experiments: flavesone, K-Obiol EC Combi (50 g/L Deltamethrin, 400 g/L PBO) and Reldan (500 g/L Chlorpyrifos-methyl) were obtained from Bio-Gene Technology, Bayer Crop Science, and Dow AgroSciences respectively. Two rates (25 and 60 ppm) were considered for the stand alone flavesone experiments.

For each strain of the borers (internal feeders), R. dominica and S. oryzae, three lots of 160 g of wheat was weighed into glass jars (500 mL capacity), i.e. one jar per treatment and another for the control (distilled water only). The solutions of each treatment (prepared at the predetermined dilution rates as alone and in combinations) were pipetted separately onto the inside of glass jars immediately above the grain surface at the rate equivalent to 10 mL of solution per kilogram of wheat. Distilled water was applied to control grain at the same rate as the treatment. All jars were sealed, briefly shaken and tumbled by hand, and then tumbled mechanically for 1 hour. Moisture content after treatment was 12%, reflecting the upper limit accepted by Australian bulk handling companies. One day after treatment, each 240 g lot of wheat was divided into three replicates of 80 g, which were placed into separate glass jars (250 mL capacity). The procedure for T. castaneum, C. ferrugineus and O. surinamensis was kept the same except that three lots of 600 g of wheat was treated per strain. One day after treatment each 600 g lot of wheat was divided into three replicates of 190 g which was then placed into glass jars (500 mL, capacity). The remaining 30 g of wheat was grounded to flour, divided into three lots of 10 g and added to the relevant replicates of whole wheat so that each replicate weighed a total of 200 g. The aim of grinding 5% of each replicate to flour was to improve the reproduction of these three pest species, which are external feeders. The above activity was repeated twice over the following two days for making a total of three replicates for each treatment.

Bioassays were initiated by adding 50 adults (1-3 weeks post-emergence) to each jar of treated or control wheat. Each jar was covered with a filter paper lid and stored in a constant environment room at 25° C. and 55% r.h. for 2 weeks, after which the adults were sieved from the wheat and mortality recorded. Thereafter, all adults (dead and alive) were discarded and the jars of wheat were incubated for a further 6 weeks when the number of adult progeny were recorded. To synchronise progeny emergence, jars containing S. oryzae and O. surinamensis were incubated at 25° C. and 55% r.h., and jars containing the other species were incubated at 30° C. and 55% r.h.

Data Analysis

Each data set is presented in simple tables with percentage adult mortality and number of live adult F1 progeny (mean±standard error of 3 replicates) of each species as well the percentage progeny reduction calculated from the mean numbers of F1 progeny in the treated wheat and untreated control.

Results

Effectiveness of Flavesone

Control mortality in both susceptible and resistant strains of all 5 species was negligible (0-1.3%) (Tables 18-22). The number of adult progeny produced in controls of *R. dominica* were 234 and 211 for the susceptible (QRD14) and resistant strain (QRD1440), respectively (Table 18); 118 (QTC4) and 321 (QTC279) for *T. castaneum* (Table 19), 360 (QCF31) and 344 (QCF73) for *C. ferrugineus* (Table 20), 348 (VOS48) and 412 (QOS302) for *O. surinamensis* (Table 21) and 716 (LS2) and 610 (QSO393) for the susceptible and resistant strains, respectively, of *S. oryzae* (Table 22).

As expected, 25 ppm of flavesone failed to achieve complete mortality of adults in both the susceptible (QRD14) and resistant (QRD1440) strains of *R. dominica*, but achieved 100 and 88% progeny reduction in the respective strains (Table 18). However, the higher rate of 60 ppm of flavesone achieved complete control of adults and progeny of both strains (Table 1) validating the Phase I results.

Against the strains of other four species, however, both the proposed rates (25 and 60 ppm) of flavesone failed to achieve complete mortality of adults (Tables 19-22); although complete progeny reduction was achieved at 60 ppm in *C. ferrugineus* and *O. surinamensis* (Tables 20 and 22). Both rates of flavesone under performed against the susceptible (QTC4) and resistant (QTC279) strains of *T. castaneum* with no adult mortality achieved and a maximum of 45% progeny reduction yielded against the former and a 36% against the latter at the higher rate of 60 ppm (Table 19). Against *C. ferrugineus*, adult mortality reached 90 and 62% in the susceptible (QCF31) and resistant (QCF73) strains, respectively, at the highest dose of 60 ppm (Table 20). At the lower dose of 25 ppm, progeny reduction in this species was recorded at the similar level of 75% for both strains and a 100% progeny reduction was recorded at the 60 ppm level (Table 20). In the case of *O. surinamensis*, flavesone at 25 ppm achieved adult mortalities of 22 and 0.7% in the susceptible (VOS48) and resistant (QOS302) strains, respectively; and a maximum of 91% in the former and 14% in the latter at the higher dose of 60 ppm (Table 21). Both rates of flavesone, however, produced very high percentage of progeny reduction (61-99%) at 25 ppm and complete reduction of progeny (100%) at 60 ppm in both strains of this species (Table 21). The effectiveness of flavesone against *S. oryzae* was similar to that observed against *T. castaneum* (Table 18 and 22). Both rates failed to achieve any significant mortality against the adults of both strains (Table 22). At 60 ppm, however, flavesone achieved 29 and 50% progeny reduction, in the resistant (QSO393) and susceptible (LS2) strains, respectively (Table 22).

TABLE 18

Effectiveness of Flavesone against adults and progeny production of *Rhyzopertha dominica* in treated wheat.

| Strain | Treatment (mg/kg) | Adult mortality (%)* | Live adult progeny* | Progeny reduction (%) |
|---|---|---|---|---|
| QRD14 | Control | 0.7 ± 0.7 | 234.7 ± 101.5 | — |
|  | Flavesone 25 | 98.0 ± 1.2 | 0.0 ± 0.0 | 100 |
|  | Flavesone 60 | 100 ± 0.0 | 0.0 ± 0.0 | 100 |
| QRD1440 | Control | 0.0 ± 0.0 | 211.0 ± 69.4 | — |
|  | Flavesone 25 | 56.7 ± 4.1 | 23.7 ± 9.0 | 88.8 |
|  | Flavesone 60 | 100 ± 0.0 | 0.0 ± 0.0 | 100 |

*Mean ± standard error

TABLE 19

Effectiveness of Flavesone against adults and progeny production of *Tribolium castaneum* in treated wheat.

| Strain | Treatment (mg/kg) | Adult mortality (%)* | Live adult progeny* | Progeny reduction (%) |
|---|---|---|---|---|
| QTC4 | Control | 1.3 ± 1.3 | 118.0 ± 41.2 | — |
|  | Flavesone 25 | 0.0 ± 0.0 | 120.0 ± 16.1 | — |
|  | Flavesone 60 | 0.0 ± 0.0 | 65.0 ± 3.2 | 45.2 |
| QTC279 | Control | 0.7 ± 0.7 | 321.3 ± 35.0 | — |
|  | Flavesone 25 | 0.0 ± 0.0 | 265.3 ± 27.7 | 17.4 |
|  | Flavesone 60 | 0.0 ± 0.0 | 204.3 ± 27.8 | 36.4 |

*Mean ± standard error

TABLE 20

Effectiveness of Flavesone against adults and progeny production of *Cryptolestes ferrugineus* in treated wheat.

| Strain | Treatment (mg/kg) | Adult mortality (%)* | Live adult progeny* | Progeny reduction (%) |
|---|---|---|---|---|
| QCF31 | Control | 1.3 ± 0.7 | 306.0 ± 2.5 | — |
|  | Flavesone 25 | 27.5 ± 17.5 | 72.0 ± 20.3 | 76.5 |
|  | Flavesone 60 | 90.0 ± 2.0 | 0.0 ± 0.0 | 100 |
| QCF73 | Control | 0.0 ± 0.0 | 344.3 ± 18.4 | — |
|  | Flavesone 25 | 3.3 ± 1.3 | 83.7 ± 6.5 | 75.7 |
|  | Flavesone 60 | 62.0 ± 6.1 | 0.0 ± 0.0 | 100 |

*Mean ± standard error

TABLE 21

Effectiveness of Flavesone against adults and progeny production of *Oryzaephilus surinamensis* in treated wheat.

| Strain | Treatment (mg/kg) | Adult mortality (%)* | Live adult progeny* | Progeny reduction (%) |
|---|---|---|---|---|
| VOS48 | Control | 0.7 ± 0.7 | 348.3 ± 32.3 | — |
|  | Flavesone 25 | 22.7 ± 2.4 | 1.3 ± 0.7 | 99.6 |
|  | Flavesone 60 | 91.3 ± 5.9 | 0.0 ± 0.0 | 100 |
| QOS302 | Control | 0.0 ± 0.0 | 412.3 ± 10.1 | — |
|  | Flavesone 25 | 0.7 ± 0.7 | 160.3 ± 15.7 | 61.2 |
|  | Flavesone 60 | 14.7 ± 8.7 | 0.0 ± 0.0 | 100 |

*Mean ± standard error

TABLE 22

Effectiveness of Flavesone against adults and progeny production of *Sitophilus oryzae* in treated wheat.

| Strain | Treatment (mg/kg) | Adult mortality (%)* | Live adult progeny* | Progeny reduction (%) |
|---|---|---|---|---|
| LS2 | Control | 0.0 ± 0.0 | 716.0 ± 75.8 | — |
|  | Flavesone 25 | 1.3 ± 0.7 | 735.3 ± 60.6 | — |
|  | Flavesone 60 | 4.0 ± 1.2 | 355.3 ± 64.7 | 50.3 |
| QSO393 | Control | 0.0 ± 0.0 | 610.0 ± 81.5 | — |
|  | Flavesone 25 | 0.7 ± 0.7 | 572.7 ± 100.9 | 6.1 |
|  | Flavesone 60 | 0.7 ± 0.7 | 430.0 ± 51.0 | 29.5 |

*Mean ± standard error

Example 13: Evaluation of Combination of Flavesone and Chlorpyrifos-Methyl (Reldan) Against Major Stored Grain Pests Having Resistance to Commonly Used Pesticides The experiments of Example 12 were repeated using a combination of flavesone and chlorpyrifos-methyl.

Across all the combined treatment experiments, control mortality in both susceptible and resistant strains of all 5 species was negligible (0-3%) (Tables 23-27). The number of adult progeny produced in R. dominica controls were 186 for the susceptible (QRD14) and resistant (QRD1440) strains (Table 23), 59 (QTC4) and 480 (QTC279) for T. castaneum (Table 24), 467 (QCF31) and 188 (QCF73) for C. ferrugineus (Table 25), 526 (VOS48) and 429 (QOS302) for O. surinamensis (Table 26) and 720 (LS2) and 565 (QSO393) for the susceptible and resistant strains, respectively, of S. oryzae (Table 27).

All experimental combinations of flavesone and chlorpyrifos-methyl applied both at the higher and lower rates were highly successful against the susceptible strains of all 5 test species, with of 100% adult mortality and progeny reduction (Tables 23-27). The effectiveness of all these combinations was greatest against the resistant strain of C. ferrugineus, where complete control of adults and progeny were achieved (Table 26). Moreover, with the exceptions of 99% progeny reduction in a couple of combinations, all these treatments achieved 100% control of progeny in resistant strains of T. castaneum (QTC279), O. surinamensis (QOS302) and S. oryzae (QSO393) (Tables 24, 26 and 27). Against the resistant strain of R. dominica (QRD1440), however, complete adult mortality was achieved only at the combination of flavesone 60+chlorpyrifos-methyl 5 and complete progeny reduction was achieved in grain treated with the combinations of flavesone 30+ chlorpyrifos-methyl 10, flavesone 60+chlorpyrifos-methyl 5, flavesone 60+ chlorpyrifos-methyl 10 (Table 23).

TABLE 23

Effectiveness of Flavesone in combination of Chlorpyrifos-methyl (OP) against adults and progeny of Rhyzopertha dominica in treated wheat.

| Strain | Treatment (mg/kg) | Adult mortality (%)* | Live adult progeny* | Progeny reduction (%) |
|---|---|---|---|---|
| QRD14 | Control | 0.0 ± 0.0 | 186.7 ± 62.7 | — |
| | Flavesone 30 + chlorpyrifos-methyl 5 | 100 ± 0.0 | 0.0 ± 0.0 | 100 |
| | Flave sone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QRD1440 | Control | 0.7 ± 0.7 | 186.7 ± 62.7 | — |
| | Flavesone 30 + chlorpyrifos-methyl 5 | 81.3 ± 7.7 | 4.3 ± 3.0 | 97.7 |
| | Flavesone 30 + chlorpyrifos-methyl 10 | 96.0 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 99.3 ± 0.7 | 0.0 ± 0.0 | 100 |

*Mean ± standard error

TABLE 24

. Effectiveness of Flavesone in combination of Chlorpyrifos-methyl (OP) against adults and progeny of Tribolium castaneum in treated wheat.

| Strain | Treatment (mg/kg) | Adult mortality (%)* | Live adult progeny* | Progeny reduction (%) |
|---|---|---|---|---|
| QTC4 | Control | 2.0 ± 0.0 | 59.3 ± 26.1 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QTC279 | Control | 0.0 ± 0.0 | 480.7 ± 25.6 | — |
| | Flavesone 30 + chlorpyrifos-methyl 5 | 99.3 ± 0.7 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |

*Mean ± standard error

TABLE 25

Effectiveness of Flavesone in combination of Chlorpyrifos-methyl (OP) against adults and progeny of Cryptolestes ferrugineus in treated wheat.

| Strain | Treatment (mg/kg) | Adult mortality (%)* | Live adult progeny* | Progeny reduction (%) |
|---|---|---|---|---|
| QCF31 | Control | 2.7 ± 1.8 | 467.0 ± 21.2 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |
| QCF73 | Control | 2.7 ± 0.7 | 188.7 ± 30.9 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |

*Mean ± standard error

TABLE 26

Effectiveness of Flavesone in combination of Chlorpyrifos-methyl (OP) against adults and progeny of Oryzaephilus surinamensis in treated wheat.

| Strain | Treatment (mg/kg) | Adult mortality (%)* | Live adult progeny* | Progeny reduction (%) |
|---|---|---|---|---|
| QVOS48 | Control | 1.3 ± 0.7 | 526.3 ± 24.4 | — |
| | Flavesone 30 + chlorpyrifos-methyl 5 | 100 ± 0.0 | 0.0 ± 0.0 | 100 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.0 ± 0.0 | 100 |
| | Flavesone 60 + chlorpyrifos-methyl 10 | 100 ± 0.0 | 0.0 ± 0.0 | 100 |

TABLE 26-continued

Effectiveness of Flavesone in combination of Chlorpyrifos-methyl (OP) against adults and progeny of *Oryzaephilus surinamensis* in treated wheat.

| Strain | Treatment (mg/kg) | Adult mortality (%)* | Live adult progeny* | Progeny reduction (%) |
|---|---|---|---|---|
| QOS302 | Control | 0.7 ± 0.7 | 429.0 ± 28.2 | — |
| | Flavesone 30 + chlorpyrifos-methyl 5 | 164.0 ± 41.0 | 4.0 ± 2.0 | 61.8 |
| | Flavesone 30 + chlorpyrifos-methyl 10 | 116.3 ± 37.2 | 8.7 ± 4.1 | 72.9 |
| | Flavesone 60 + chlorpyrifos-methyl 5 | 27.3 ± 3.7 | 0.7 ± 1.6 | 99.8 |
| | Flavesone 60 + chlorpyrifos-methyl 10 | 30.7 ± 1.8 | 0.0 ± 0.0 | 100 |

*Mean ± standard error

TABLE 27

Effectiveness of Flavesone in combination of Chlorpyrifos-methyl (OP) against adults and progeny of *Sitophilus oryzae* in treated wheat.

| Strain | Treatment (mg/kg) | Adult mortality (%)* | Live adult progeny* | Progeny reduction (%) |
|---|---|---|---|---|
| LS2 | Control | 2.7 ± 2.7 | 720.3 ± 112.3 | — |
| | Flavesone 30 + chlorpyrifos-methyl 5 | 100 ± 0.0 | 100 ± 0.0 | 100 |
| | Flavesone 30 + chlorpyrifos-methyl 10 | 100 ± 0.0 | 100 ± 0.0 | 100 |
| | Flavesone 60 + chlorpyrifos-methyl 5 | 100 ± 0.0 | 100 ± 0.0 | 100 |
| | Flavesone 60 + chlorpyrifos-methyl 10 | 100 ± 0.0 | 100 ± 0.0 | 100 |
| QSO393 | Control | 0.0 ± 0.0 | 565.7 ± 35.0 | — |
| | Flavesone 30 + chlorpyrifos-methyl 5 | 100 ± 0.0 | 0.3 ± 0.3 | 99.9 |
| | Flavesone 30 + chlorpyrifos-methyl 10 | 100 ± 0.0 | 0.0 ± 0.0 | 100 |
| | Flavesone 60 + chlorpyrifos-methyl 5 | 100 ± 0.0 | 0.7 ± 1.3 | 99.9 |
| | Flavesone 60 + chlorpyrifos-methyl 10 | 100 ± 0.0 | 0.0 ± 0.0 | 100 |

*Mean ± standard error

Table 28 provides an overview of the effectiveness of the combination of chlorpyrifos-methyl and flavesone.

TABLE 28

Overview of effectiveness of Flavesone in combination with Chlorpyrifos-methyl (CM) at different rates against five major stored grain pests.

| | | 30 ppm flavesone plus | | | | 60 ppm flavesone plus | | | |
|---|---|---|---|---|---|---|---|---|---|
| | | 5 ppm CM | | 10 ppm CM | | 5 ppm CM | | 10 ppm CM | |
| Pest species | Strain | Adults | F1 | Adults | F1 | Adults | F1 | Adults | F1 |
| *R. dominica* | Susceptible | ✓* | ✓ | ✓ | ✓ | ✓ | ✓ | ✓ | ✓ |
| | Resistant | X | X | X | ✓ | ✓ | ✓ | 99.3✓ | ✓ |
| *T. castaneum* | Susceptible | ✓ | ✓ | ✓ | ✓ | ✓ | ✓ | ✓ | ✓ |
| | Resistant | 99.3✓ | ✓ | ✓ | ✓ | ✓ | ✓ | ✓ | ✓ |
| *C. ferrugineus* | Susceptible | ✓ | ✓ | ✓ | ✓ | ✓ | ✓ | ✓ | ✓ |
| | Resistant | ✓ | ✓ | ✓ | ✓ | ✓ | ✓ | ✓ | ✓ |
| *O. surinamensis* | Susceptible | ✓ | ✓ | ✓ | ✓ | ✓ | ✓ | ✓ | ✓ |
| | Resistant | X | X | X | X | X | 99.8✓ | X | ✓ |
| *S. oryzae* | Susceptible | ✓ | ✓ | ✓ | ✓ | ✓ | ✓ | ✓ | ✓ |
| | Resistant | ✓ | 99.9✓ | ✓ | ✓ | ✓ | 99.9✓ | ✓ | ✓ |

Example 14: Evaluation of the Combination of Flavesone and Deltamethrin (K-Obiol) Against *R. dominica* Susceptible and Resistant Strains The Experiment of Example 12 was repeated using a combination of flavesone and deltamethrin with *R. dominica* susceptible QRD14 and resistant QRD1440 strains.

In these experiments, the control mortality remained below 1% in both the susceptible and resistant strains of this species and similar number of live adult progeny (126 and 125) were emerged (Table 29). In all combinations, complete control of both adults and progeny was achieved against the susceptible strain (QRD14), and a high level of control was achieved against the resistant strain (QRD1440) (Table 29). Against adults of the resistant strain, all combinations yielded percentage mortality of 93-100%. Similarly, all combinations yielded 99-100% reduction of progeny of the resistant strain QRD1440 (Table 29).

The results are shown in Table 29.

TABLE 29

Effectiveness of Flavesone in combination of Deltamethrin against adults and progeny of *Rhyzopertha dominica* in treated wheat.

| Strain | Treatment (mg/kg) | Adult mortality % | Live adult progeny* | Progeny reduction (%) |
|---|---|---|---|---|
| QRD14 | Control | 0.7 ± 0.7 | 126.3 ± 29.9 | — |
| | Flavesone 30 + deltamethrin 0.5 | 100 ± 0.0 | 0.0 ± 0.0 | 100 |
| | Flavesone 30 + deltamethrin 1 | 100 ± 0.0 | 0.0 ± 0.0 | 100 |
| | Flavesone 60 + deltamethrin 0.5 | 100 ± 0.0 | 0.0 ± 0.0 | 100 |
| | Flavesone 60 + deltamethrin 1 | 100 ± 0.0 | 0.0 ± 0.0 | 100 |
| QRD1440 | Control | 0.7 ± 0.7 | 125.0 ± 47.7 | — |
| | Flavesone 30 + deltamethrin 0.5 | 93.3 ± 3.5 | 1.0 ± 1.0 | 99.2 |
| | Flavesone 30 + deltamethrin 1 | 97.3 ± 0.7 | 0.0 ± 0.0 | 100 |
| | Flavesone 60 + deltamethrin 0.5 | 100 ± 0.0 | 0.0 ± 0.0 | 100 |

TABLE 29-continued

Effectiveness of Flavesone in combination of Deltamethrin against adults and progeny of *Rhyzopertha dominica* in treated wheat.

| Strain | Treatment (mg/kg) | Adult mortality % | Live adult progeny* | Progeny reduction (%) |
|---|---|---|---|---|
| | Flavesone 60 + deltamethrin 1 | 99.3 ± 0.7 | 0.0 ± 0.0 | 100 |

*Mean ± standard error

What is claimed is:

1. A method of controlling pesticide resistant pests, wherein the pesticide resistant pests are insects infesting an agricultural environment, said method comprising applying to the agricultural environment, a compound of formula (I)

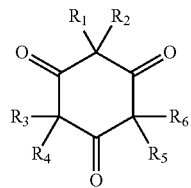

wherein:
  $R^1$ is selected from the group consisting of $C(=O)R_7$, $-OR_8$, $-SR_8$, $-C_{1-10}$hydroxyalkyl, $-NR_9R_{10}$, $-C(=N-R_9)R_7$, $-C(=N-OH)R_7$, $-NO$, $-NO_2$, $-N(OR_8)R_7$ and $-OSO_3R_8$;
  $R_2$ is selected from the group consisting of hydrogen, $-C_{1-10}$alkyl, $-C_{2-10}$alkenyl, aryl and heteroaryl;
  $R_3$, $R_4$, $R_5$ and $R_6$ are each independently selected from the group consisting of hydrogen, $-C_{1-10}$alkyl, $-C_{3-6}$cycloalkyl, $-C_{2-10}$alkenyl, $-C_{1-10}$haloalkyl, $-C_{1-10}$dihaloalkyl, $-C_{1-10}$trihaloalkyl, $-OR_8$, $-SR_8$, $-NR_9R_{10}$, $-C(=N-R_9)R_7$, $-NO$, $-NO_2$, $-NR_9OR_8$, $-OSO_3R_8$, $-C_{1-10}$alkylaryl and $C(=O)R_7$;
  $R_7$ is selected from the group consisting of hydrogen, $-C_{1-10}$alkyl, $-C_{2-10}$alkylaryl, $C_{3-6}$cycloalkyl, $-C_{2-10}$alkenyl, $-C_{1-10}$alkylheteroaryl, $-C_{1-10}$haloalkyl, $-C_{1-10}$dihaloalkyl, $-C_{1-10}$trihaloalkyl, $-C_{1-10}$haloalkoxy, $-C_{1-10}$hydroxyalkyl, $-C_{1-10}$thioalkyl, $-C_{1-10}$nitroalkyl, $-C_{1-3}$alkylOC$_{1-3}$alkyl, $-C_{1-3}$alkylOC$_{1-3}$haloalkyl, $-C_{1-3}$alkylOC$_{1-3}$dihaloalkyl, $-C_{1-3}$alkylOC$_{1-3}$trihaloalkyl, $-OR_8$, $-SR_8$ and $-NR_9R_{10}$;
  $R_8$ is selected from the group consisting of hydrogen, $-C_{1-10}$alkyl, $-C_{2-10}$alkylaryl, $-C_{3-6}$cycloalkyl, $-C_{2-10}$alkenyl, $-C_{1-10}$alkylheteroaryl, $-C_{1-10}$haloalkyl, $-C_{1-10}$dihaloalkyl, $-C_{1-10}$trihaloalkyl, $-C_{1-10}$haloalkoxy, $-C_{1-10}$hydroxyalkyl, $-C_{1-10}$thioalkyl and $-C_{1-10}$nitroalkyl;
  $R_9$ and $R_{10}$ are independently selected from the group consisting of hydrogen, $-C_{1-10}$alkyl, $-C_{2-10}$alkylaryl, $-C_{3-6}$cycloalkyl, $-C_{2-10}$alkenyl, $-C_{1-10}$alkylheteroaryl, $-C_{1-10}$haloalkyl, $-C_{1-10}$dihaloalkyl, $-C_{1-10}$trihaloalkyl; or a tautomer thereof; wherein the agricultural environment is a plant selected from the group consisting of a crop, a tree, soil, an area around a plant as it grows, and an area where plants or parts of plants are stored.

2. The method according to claim 1 wherein the compound of formula (I) is a compound of formula (II):

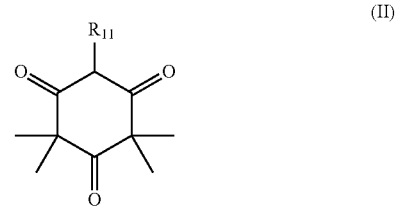

wherein:
  $R_{11}$ is selected from $-CR_{12}R_{13}R_{14}$ or $-NR_{15}R_{16}$;
  one of $R_{12}$ and $R_{13}$ is hydrogen and the other is hydroxyl or $-OCR_{17}R_{18}R_{19}$ or $R_{12}$ and $R_{13}$ together form an oxo group (=O) or a =N—OH group;
  $R_{14}$ is $-CH(CH_3)CR_{20}R_{21}R_{22}$, $-CH_2CH(CH_3)CR_{20}R_{21}R_{22}$ or $-CH(CH_3)CH_2CR_{20}R_{21}R_{22}$;
  $R_{15}$ and $R_{16}$ are independently selected from the group consisting of hydrogen and $C_{1-10}$alkyl;
  $R_{17}$, $R_{18}$ and $R_{19}$ are independently selected from the group consisting of hydrogen or halo; and
  $R_{20}$, $R_{21}$ and $R_{22}$ are independently selected from hydrogen, hydroxyl, halo, $NO_2$ and $-OCR_{17}R_{18}R_{19}$; or a tautomer thereof.

3. The method according to claim 1 wherein the compound of formula (I) is a compound of formula (III):

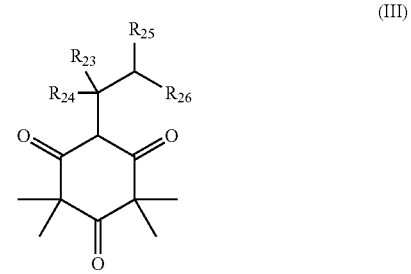

wherein:
  one of $R_{23}$ and $R_{24}$ is hydrogen and the other is hydroxyl or $-OCR_{27}R_{28}R_{29}$ or $R_{23}$ and $R_{24}$ together form an oxo group (=O);
  $R_{25}$ is $-CR_{30}R_{31}R_{32}$, $-CH_2CR_{30}R_{31}R_{32}$ or $-CH(CH_3)CR_{30}R_{31}R_{32}$;
  $R_{26}$ is H or $-CH_3$; wherein where $R_{26}$ is H, $R_{25}$ is $-CH(CH_3)CR_{30}R_{31}R_{32}$;
  $R_{27}$, $R_{28}$ and $R_{29}$ are independently selected from hydrogen or halo; and
  $R_{30}$, $R_{31}$ and $R_{32}$ are independently selected from hydrogen, hydroxyl, halo, $NO_2$ and $-OCR_{27}R_{28}R_{29}$; or a tautomer thereof.

4. The method according to claim 1 wherein the compound of formula (I) is selected from the group consisting of:

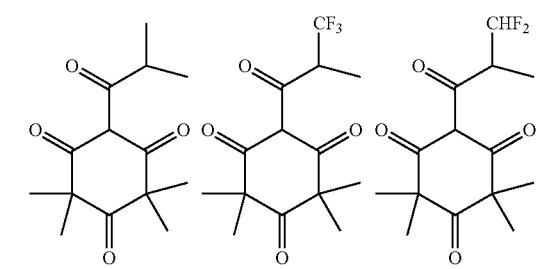
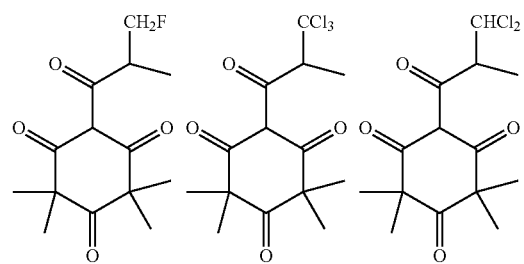
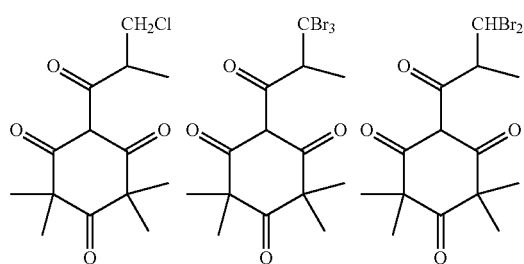
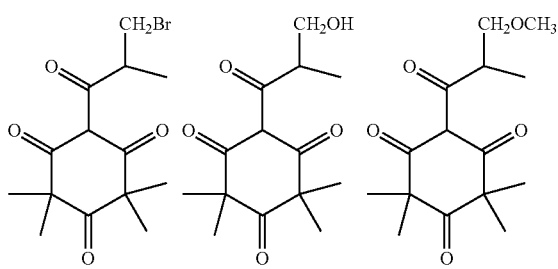
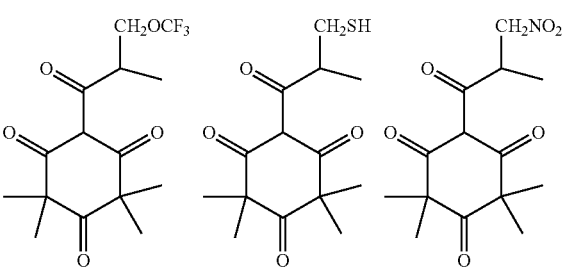
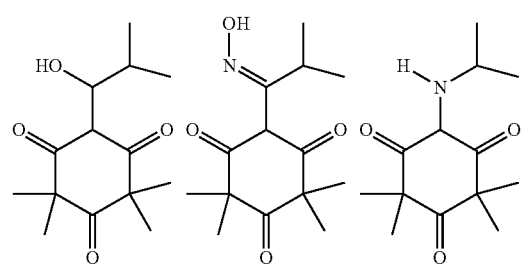
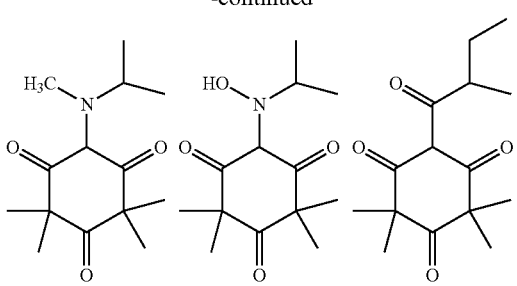
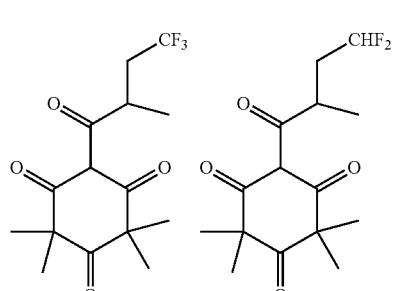
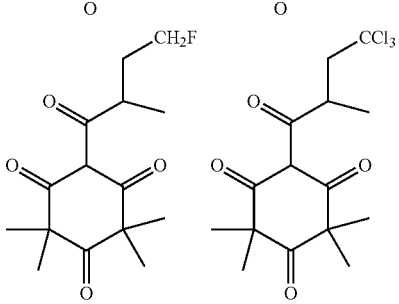
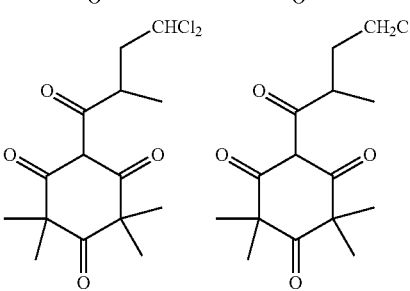
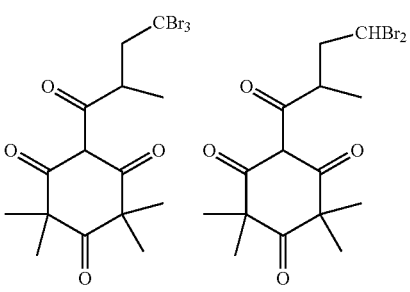
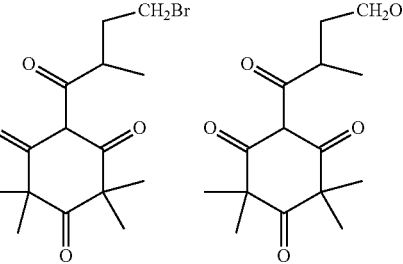

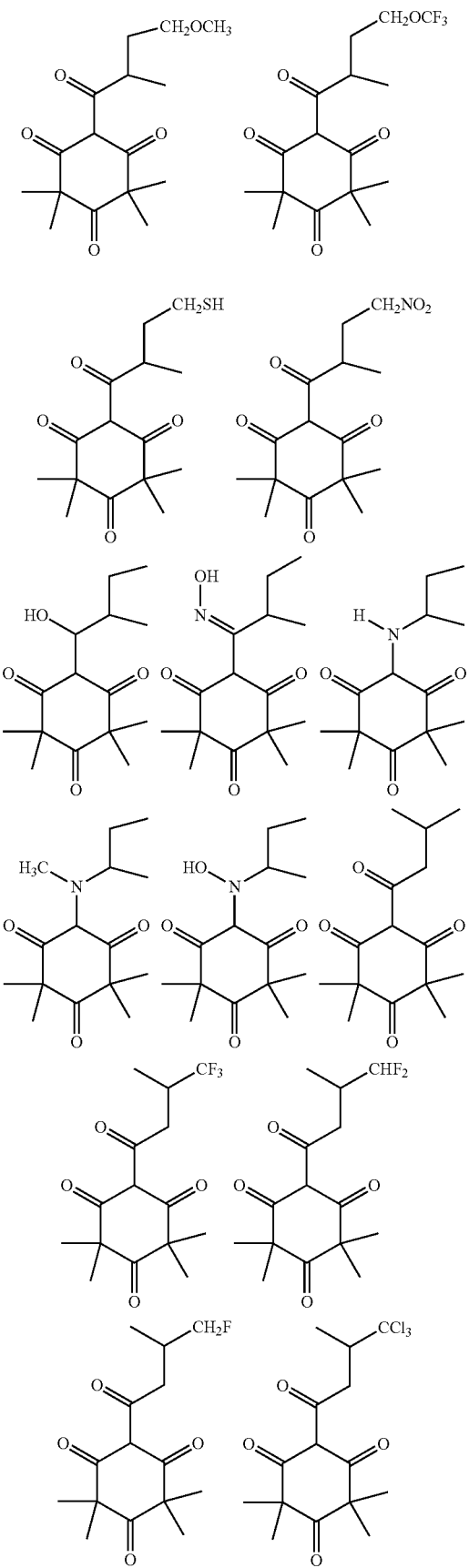
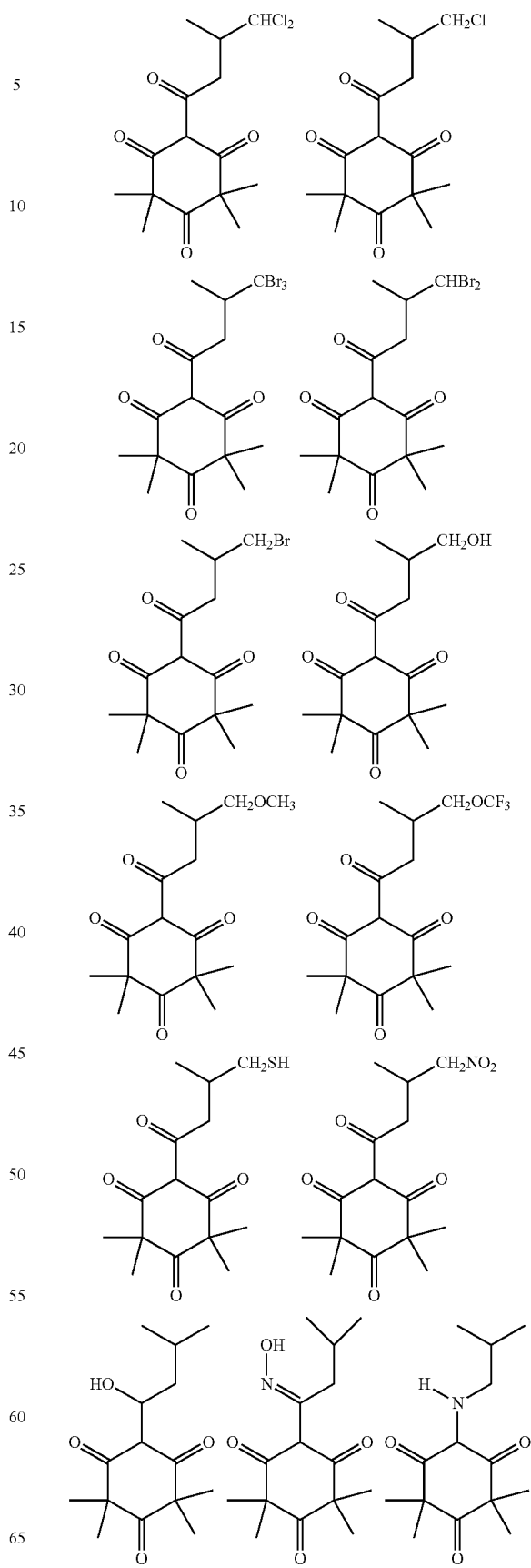

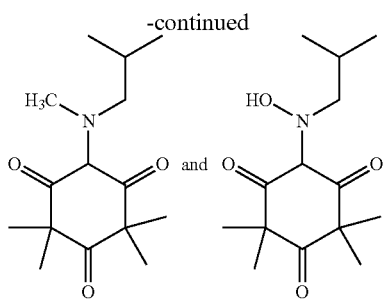

and or a tautomer thereof.

5. The method according to claim 1 wherein the compound of formula (I) is selected from the group consisting of flavesone, leptospermone and isoleptospermone.

6. The method according to claim 5 wherein the compound of formula (I) is flavesone.

7. The method according to claim 1 wherein the pesticide resistant pests are insects resistant to one or more insecticides.

8. The method according to claim 1 wherein the pesticide resistant pest is exposed to the compounds of formula (I) in an amount in the range of about 200 ppm to about 800 ppm or about 300 ppm to about 600 ppm or about 800 ppm to about 2,500 ppm or about 900 ppm to about 2000 ppm.

9. The method according to claim 1 wherein the insects are selected from the group consisting of *Rhyzopertha dominica, Sitophilus oryzae, Triobolium castaneum, Oryzaephilus surinamensis* or *Cryptolestes ferrugineus*.

10. The method according to claim 9 wherein the insects are adults.

11. The method according to claim 1 wherein a pesticide resistant pest is exposed to a compound of formula (I) in combination with a second pesticide, wherein the second pesticide has a different mode of action from the compound of formula (I).

12. The method according to claim 11 wherein the second pesticide is selected from the group consisting of at least one of a sodium channel modulator, an acetylcholinesterase (AChE) inhibitor, a GABA-gated chloride channel antagonist, a nicotinergic acetylcholine receptor agonist, an allosteric acetylcholine receptor modulator, a chloride channel actuator, a juvenile hormone mimic, a homopteran feeding blocker, a mitochondrial ATP synthase inhibitor, an uncoupler of oxidative phosphorylation, a nicotinic acetylcholine receptor channel blocker, an inhibitor of chitin biosynthesis, a moulting disruptor, an ecdysone receptor agonist or disruptor, an octapamine receptor agonist, a mitochondrial complex I electron transport inhibitor, an acetyl CoA carboxylase inhibitor, a voltage-dependent sodium channel blocker, a mitochondrial complex IV electron inhibitor, a mitochondrial complex IV electron transport inhibitor and a ryanodine receptor modulator.

13. A method of protecting stored plant parts from pest infestation by pesticide resistant pests, wherein the pest infestation is caused by a population of pests comprising pesticide resistant pests, said method comprising contacting the plant part with a compound of formula (I)

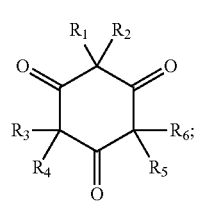

(I)

wherein:
$R_1$ is selected from the group consisting of —C(=O)$R_7$, —O$R_8$, —S$R_8$, —$C_{1-10}$hydroxyalkyl, —N$R_9R_{10}$, —C(=N—$R_9$)$R_7$, —C(=N—OH)$R_7$, —NO, —NO$_2$, —N(O$R_8$)$R_7$ and —OSO$_3R_8$;

$R_2$ is selected from the group consisting of hydrogen, —$C_{1-10}$alkyl, —$C_{2-10}$alkenyl, aryl and heteroaryl;

$R_3$, $R_4$, $R_5$ and $R_6$ are each independently selected from the group consisting of hydrogen, —$C_{1-10}$alkyl, —$C_{3-6}$cycloalkyl, —$C_{2-10}$alkenyl, —$C_{1-10}$haloalkyl, —$C_{1-10}$dihaloalkyl, —$C_{1-10}$trihaloalkyl, —O$R_8$, —S$R_8$, —N$R_9R_{10}$, —C(=N—$R_9$)$R_7$, —NO, —NO$_2$, —N$R_9$O$R_8$, —OSO$_3R_8$, —$C_{1-10}$alkylaryl and —C(=O)$R_7$;

$R_7$ is selected from the group consisting of hydrogen, —$C_{1-10}$alkyl, —$C_{2-10}$alkylaryl, $C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl, —$C_{1-10}$nitroalkyl, —$C_{1-3}$alkylO$C_{1-3}$alkyl, —$C_{1-3}$alkylO$C_{1-3}$haloalkyl, —$C_{1-3}$alkylO$C_{1-3}$dihaloalkyl, —$C_{1-3}$alkylO$C_{1-3}$trihaloalkyl, —O$R_8$, —S$R_8$ and —N$R_9R_{10}$;

$R_8$ is selected from the group consisting of hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl, —$C_{1-10}$haloalkoxy, —$C_{1-10}$hydroxyalkyl, —$C_{1-10}$thioalkyl and —$C_{1-10}$nitroalkyl;

$R_9$ and $R_{10}$ are independently selected from the group consisting of hydrogen, —$C_{1-10}$alkyl, —$C_{2-10}$alkylaryl, —$C_{3-6}$cycloalkyl, —$C_{2-10}$alkenyl, —$C_{1-10}$alkylheteroaryl, —$C_{1-10}$haloalkyl, —$C_{1-10}$dihaloalkyl, —$C_{1-10}$trihaloalkyl; or a tautomer thereof.

14. The method according to claim 13 wherein the plant part is grain.

15. The method according to claim 13 where the pest population comprising pesticide resistance pests is selected from the group consisting of *Rhyzopertha dominica, Sitophilus oryzae, Triobolium castaneum, Oryzaephilus surinamensis* and *Cryptolestes ferrugineus*.

* * * * *

UNITED STATES PATENT AND TRADEMARK OFFICE
CERTIFICATE OF CORRECTION

PATENT NO. : 11,259,522 B2
APPLICATION NO. : 16/856984
DATED : March 1, 2022
INVENTOR(S) : Robert Klupacs It is certified that error appears in the above-identified patent and that said Letters Patent is hereby corrected as shown below:

In the Specification

In Column 1, Line 20, delete "(F.)," and insert --(F.)),--.

In Column 1, Line 21, delete "(L.)," and insert --(L.)),--.

In Column 1, Line 23, delete "suranamensis" and insert --surinamensis--.

In Column 1, Line 23, delete "(L.)" and insert --(L.))--.

In Column 2, Line 28, delete "—$C_{2-10}$alkylheteroaryl," and insert -- —$C_{1-10}$alkylheteroaryl,--.

In Column 3, Line 9, before "the past" insert --wherein--.

In Column 6, Line 32, delete "1H,3H-1-oxoisoindolyl," and insert --1H, 3H-1-oxoisoindolyl,--.

In Column 7, Line 43, delete "fluozuron," and insert --fluazuron,--.

In Column 7, Line 44, delete "flumetron," and insert --fluometuron,--.

In Column 13, Line 35, delete "(1-isobutyroyl" and insert --(1-isobutyryl--.

In Column 15, Line 25, delete "Grapholitha" and insert --Grapholita--.

In Column 15, Line 25, delete "Grapholitha" and insert --Grapholita--.

In Column 15, Line 25, delete "Heliocoverpa" and insert --Helicoverpa--.

In Column 15, Line 26, delete "Heliocoverpa" and insert --Helicoverpa--.

Signed and Sealed this
Seventh Day of June, 2022

*Katherine Kelly Vidal*
Katherine Kelly Vidal
*Director of the United States Patent and Trademark Office*

In Column 15, Line 26, delete "Heliocoverpa" and insert --Helicoverpa--.

In Column 15, Line 27, delete "Hypliantria" and insert --Hyphantria--.

In Column 15, Line 28, delete "Hyponomeuta" and insert --Yponomeuta--.

In Column 15, Line 33, delete "Operophthera" and insert --Operophtera--.

In Column 15, Line 35, delete "flamnea," and insert --flammea,--.

In Column 15, Line 42, delete "myopaeforinis," and insert --myopaeformis,--.

In Column 15, Line 43, delete "Thaumatopoea" and insert --Thaumetopoea--.

In Column 15, Line 50, delete "Ceuthorhynchus" and insert --Ceutorhynchus--.

In Column 15, Line 51, delete "Ceuthorhynchus" and insert --Ceutorhynchus--.

In Column 15, Line 58, delete "califomicus," and insert --californicus,--.

In Column 16, Line 22, delete "Heliothirips" and insert --Heliothrips--.

In Column 16, Line 29, delete "pharaonic," and insert --pharaonis,--.

In Column 16, Line 45, delete "Eriosorna" and insert --Eriosoma--.

In Column 16, Line 46, delete "Macrosiphun" and insert --Macrosiphum--.

In Column 17, Line 15, delete "Lepisina" and insert --Lepisma--.

In Column 17, Line 46, delete "acepahte," and insert --acephate,--.

In Column 17, Line 59, delete "profenfos," and insert --profenofos,--.

In Column 17, Line 65, delete "α-enosulfun." and insert --α-endosulfan.--.

In Column 18, Line 4, delete "thiocloprid" and insert --thiacloprid--.

In Column 18, Line 14, delete "flanicamid." and insert --flonicamid.--.

In Column 18, Lines 34-35, delete "fluacrypryrim." and insert --fluacrypyrim.--.

In Column 18, Line 39, delete "spiromesfen" and insert --spiromesifen--.

In Column 18, Lines 49-50, delete "chloranthraniliprole," and insert --chlorantraniliprole,--.

CERTIFICATE OF CORRECTION (continued)
U.S. Pat. No. 11,259,522 B2

In Column 18, Line 56, delete "Balustium" and insert --Balaustium--.

In Column 18, Line 60, delete "Eotetranichus" and insert --Eotetranychus--.

In Column 18, Lines 61-62, delete "Eryophyes" and insert --Eriophyes--.

In Column 18, Line 66, delete "mite" and insert --mite,--.

In Column 19, Line 6, delete "miccroplus," and insert --microplus,--.

In Column 19, Line 8, delete "Ornithodorus" and insert --Ornithodoros--.

In Column 19, Line 9, delete "apendiculatus," and insert --appendiculatus,--.

In Column 19, Line 16, delete "amiton," and insert --amitone,--.

In Column 19, Line 28, delete "cyenopyrafren," and insert --cyenopyrafen,--.

In Column 20, Line 37, delete "ferrugineous" and insert --ferrugineus--.

In Column 20, Line 55, delete "Balustium" and insert --Balaustium--.

In Column 24, Line 5, delete "day" and insert --days--.

In Column 24, Line 7, delete "minute" and insert --minutes--.

In Columns 31-32, Table 14, Line 2, delete "coeffeicient" and insert --coefficient--.

In Column 32, Line 10, delete "choi" and insert --choy--.

In Column 32, Line 31, delete "choi" and insert --choy--.

In Column 33, Line 48, delete "http://R-project.org)." and insert --http://www.R-project.org).--.

In Column 34, Line 43, delete "2014)" and insert --2014).--.

In Column 35, Line 16, delete "g/mL," and insert --µg/mL,--.

In Column 35, Line 37, delete "(LC50)" and insert --(LC$_{50}$)--.

In Column 35, Line 42, delete "(LC50)" and insert --(LC$_{50}$)--.

In Column 39, Line 52, delete "Flave sone" and insert --Flavesone--.

CERTIFICATE OF CORRECTION (continued)
U.S. Pat. No. 11,259,522 B2

In the Claims

In Column 43, Claim 1, Line 31, delete "$R^1$" and insert --$R_1$--.

In Column 43, Claim 1, Line 31, delete "C(=O)R$_7$," and insert -- —C(=O)R$_7$,--.

In Column 43, Claim 1, Line 37, delete "—C$_{1-10}$alkyl,—C$_{2-10}$alkenyl," and insert -- —C$_{1-10}$alkyl, —C$_{2-10}$alkenyl,--.

In Column 43, Claim 1, Line 44, delete "C(=O)R$_7$;" and insert -- —C(=O)R$_7$;--.

In Column 43, Claim 1, Line 47, delete "C$_{3-6}$cycloalkyl," and insert -- —C$_{3-6}$cycloalkyl,--.

In Column 44, Claim 2, Line 26, delete "C$_{1-10}$alkyl;" and insert -- —C$_{1-10}$alkyl;--.

In Column 44, Claim 3, Line 57, delete "wherein where" and insert --wherein--.

In Column 49, Claim 9, Line 29, delete "Triobolium" and insert --Tribolium--.

In Column 49, Claim 12, Line 49, delete "octapamine" and insert --octopamine--.

In Column 50, Claim 13, Lines 5-13, delete " " and insert -- --.

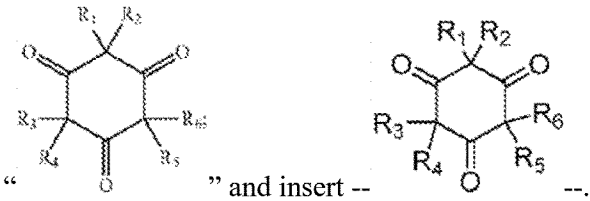

In Column 50, Claim 13, Line 30, delete "C$_{3-6}$cycloalkyl," and insert -- —C$_{3-6}$cycloalkyl,--.

In Column 50, Claim 15, Line 55, delete "Triobolium" and insert --Tribolium--.